United States Patent
Law et al.

(10) Patent No.: US 10,990,246 B1
(45) Date of Patent: Apr. 27, 2021

(54) TECHNIQUES FOR GENERATING DIGITAL CONTENT

(71) Applicant: Amazon Technologies, Inc., Seattle, WA (US)

(72) Inventors: David Law, Seattle, WA (US); Anna Godfrey, Seattle, WA (US); Kevin Freitas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 16/177,094

(22) Filed: Oct. 31, 2018

(51) Int. Cl.
   *G06F 3/0482* (2013.01)
   *G06F 3/0484* (2013.01)
   *G06Q 30/06* (2012.01)
   *G06T 11/60* (2006.01)
   *G06K 9/00* (2006.01)

(52) U.S. Cl.
   CPC ........ *G06F 3/0482* (2013.01); *G06F 3/04845* (2013.01); *G06Q 30/0633* (2013.01); *G06T 11/60* (2013.01); *G06K 9/00362* (2013.01)

(58) Field of Classification Search
   CPC ..... G06F 3/0482; G06F 3/04845; G06T 11/60
   See application file for complete search history.

(56) References Cited

U.S. PATENT DOCUMENTS

| | | | | |
|---|---|---|---|---|
| 10,115,149 B1 * | 10/2018 | Deem | .................... | G06T 19/006 |
| 10,319,150 B1 * | 6/2019 | Canada | ................... | G06T 11/00 |
| 10,534,809 B2 * | 1/2020 | Wiesel | .................... | G06T 7/194 |
| 2008/0163379 A1 * | 7/2008 | Robinson | ............ | G06F 3/04815 726/27 |
| 2009/0165140 A1 * | 6/2009 | Robinson | ............... | G06Q 30/02 726/26 |
| 2011/0059728 A1 * | 3/2011 | Poisson | .............. | H04N 1/00307 455/414.1 |
| 2013/0054686 A1 * | 2/2013 | Hassman | ................ | G06F 16/95 709/204 |
| 2013/0137419 A1 * | 5/2013 | Roa | .......................... | H04W 4/50 455/420 |
| 2013/0238724 A1 * | 9/2013 | Cunningham | ...... | G06F 3/04842 709/206 |
| 2014/0253553 A1 * | 9/2014 | Jovanovic | ........... | G06F 3/04883 345/427 |
| 2014/0282013 A1 * | 9/2014 | Amijee | .................. | G06F 3/0482 715/732 |
| 2015/0206349 A1 * | 7/2015 | Rosenthal | ........ | H04N 21/41407 345/633 |
| 2017/0060485 A1 * | 3/2017 | Krilivsky | .............. | G06F 3/0482 |
| 2020/0302681 A1 * | 9/2020 | Totty | ......................... | G06T 7/74 |

* cited by examiner

*Primary Examiner* — Shen Shiau

(74) *Attorney, Agent, or Firm* — Kilpatrick Townsend & Stockton LLP

(57) ABSTRACT

Techniques are disclosed for generating and modifying digital content including graphical representations of items offered within an electronic catalog. Various interfaces are provided to enable a user to create digital content utilizing graphical representations of these items. Once created, the digital content may be shared with other users and feedback may be obtained from the recipients of the digital content.

19 Claims, 18 Drawing Sheets

| IMAGE DATA STRUCTURE 402 ||
|---|---|
| IMAGE DATA STRUCTURE IDENTIFIER | VALUE = "475" |
| ITEM IDENTIFIER | VALUE = "19E57" |
| ITEM ATTRIBUTE 1 | PRICE = "$15.99" |
| ITEM ATTRIBUTE 2 | RATINGS VALUE = "5" |
| IMAGE LOCATION | VALUE = "HTTP://WWW.MARKETPLACE.COM/IMAGES/IMAGE475.COM" |
| IMAGE IDENTIFIER | VALUE = "IMAGE475" |
| SUPPLEMENTAL WEBPAGE LINK | VALUE = "HTTP://WWW.MARKETPLACE.COM/ITEM475.COM" |
| ACTION | API = "UpdateStarRating" VALUE = "User Input Value" |
| ASSOCIATED IMAGE DATA STRUCTURE | VALUE = "505" |

| CONTENT DATA STRUCTURE 404 ||
|---|---|
| CONTENT DATA STRUCTURE IDENTIFIER | VALUE = "CONTENT19847" |
| BACKGROUND IMAGE IDENTIFIER | VALUE = "19E57" |
| IMAGE DATA STRUCTURE 1 | VALUE = "475"<br>LOCATION = (X1, Y1) |
| IMAGE DATA STRUCTURE 2 | VALUE = "893"<br>LOCATION = (X2, Y2) |
| IMAGE DATA STRUCTURE 3 | VALUE = "987"<br>LOCATION = (X3, Y1) |
| CONTEXTUAL INFORMATION | NAVIGATION DATA AND/OR USER SELECTION DATA |

*FIG. 4*

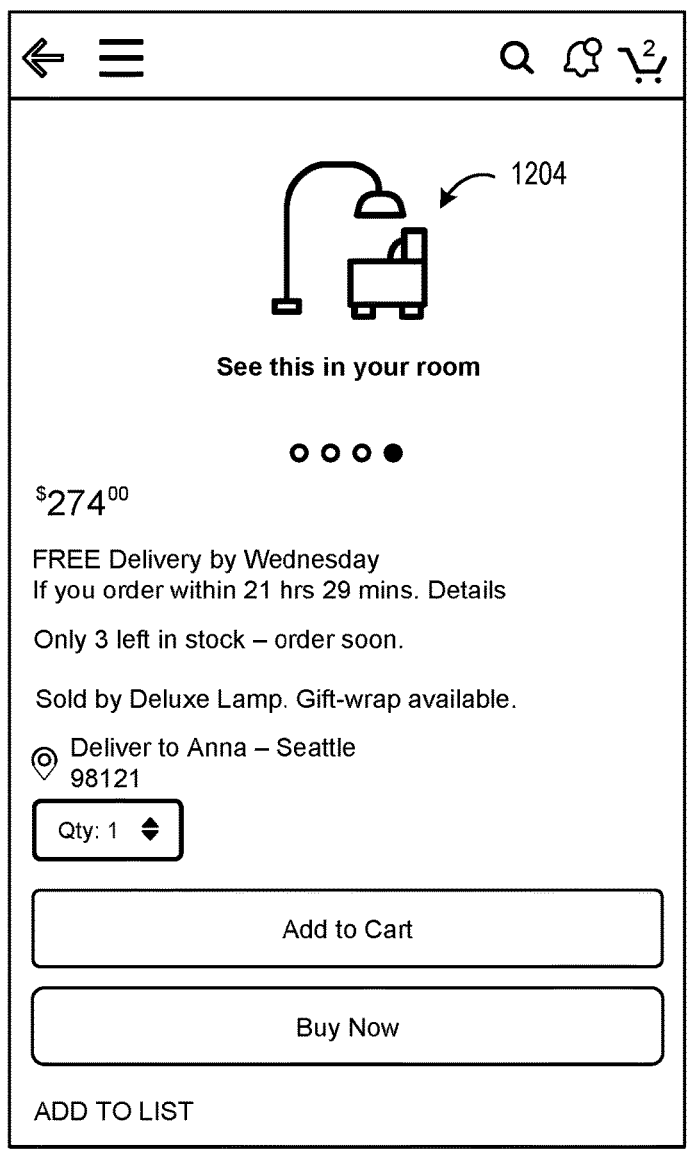
FIG. 12

US 10,990,246 B1

TECHNIQUES FOR GENERATING DIGITAL CONTENT

BACKGROUND

Users often peruse electronic marketplaces to discovery various items of interest. However, the process for searching for these items can be tedious and result in a solitary experience for the user. Within an electronic marketplace, the user may enter search queries or generally navigate through various webpages to find items that they can add to their shopping cart and/or a wish list. A wish list may be shared publically or with family or friends. Conventional electronic marketplaces fail to enable the user to provide creative input regarding how information is shared. This can result in a lackluster user experience.

BRIEF DESCRIPTION OF THE DRAWINGS

Various embodiments in accordance with the present disclosure will be described with reference to the drawings, in which:

FIG. 4 illustrates an exemplary image data structure and an exemplary content data structure, in accordance with at least one embodiment;

FIG. 12 illustrates yet another example user interface for generating digital content, in accordance with at least one embodiment;

DETAILED DESCRIPTION

Figure 1:
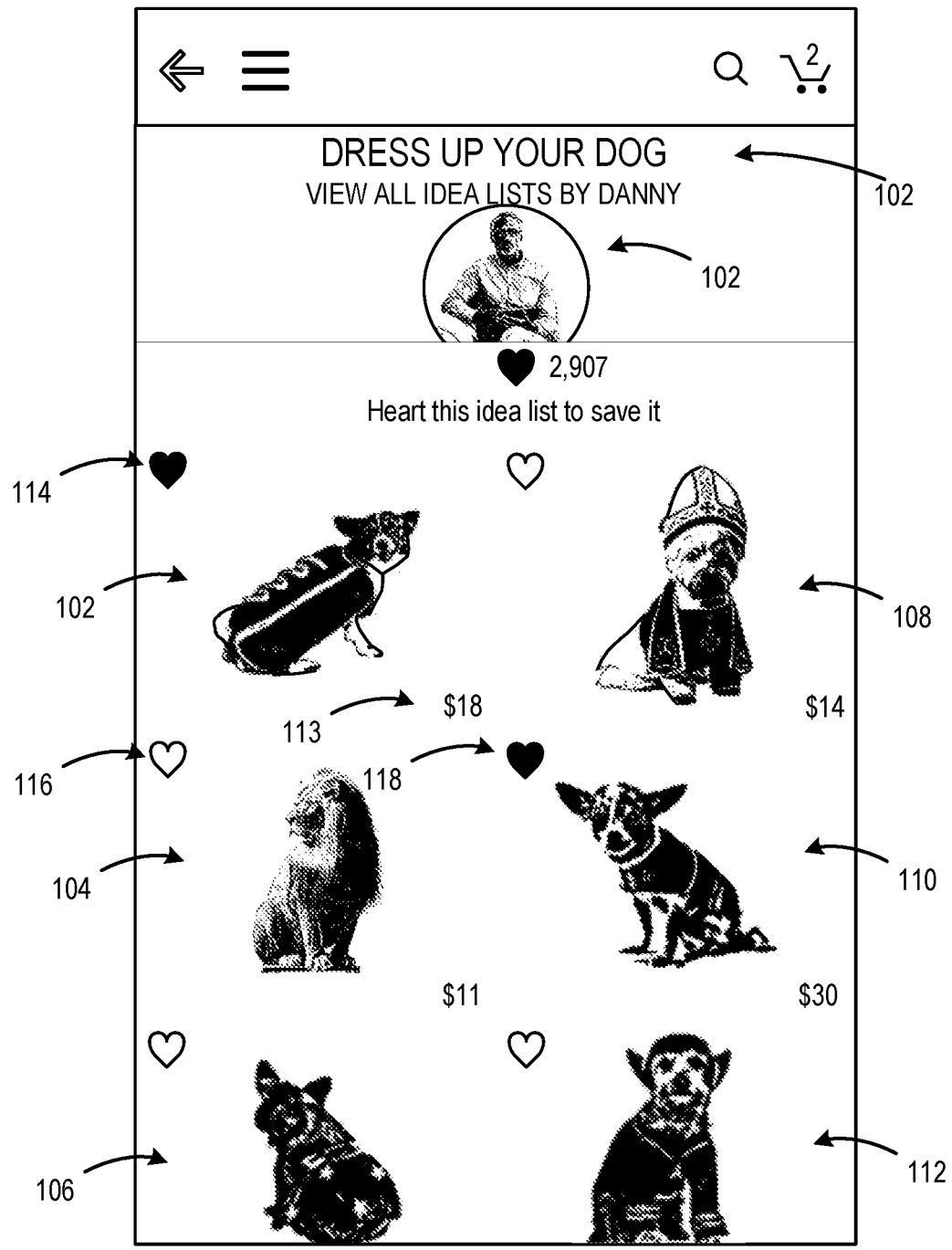
FIG. 1 illustrates an example user interface for searching for items of interest, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to systems and methods for generating and modifying digital content associated with an electronic marketplace. "Digital content" (also referred to as "electronic content") may include any suitable number or type of content elements (e.g., foreground images, text, background images, audio, icons, color schemes, etc.). As used herein, an "electronic marketplace" may include an online website that facilitates the offering and consumption of items (e.g., physical or virtual goods) and/or services. As used herein, a "graphical element" (also referred to as a user interface element/option) may be any suitable component provided in a graphical interface such as buttons, images, checkboxes, radio buttons, edit boxes, etc. In some embodiments, a user may peruse various network pages (e.g., item detail pages, search results, idea lists, wish lists, hypertext 'web' pages, etc.) via an electronic marketplace to discovery various items of interest. Various options may be provided via the network pages to enable the user to indicate an interest in particular items. By way of example, one example network page may provide the user the ability to add the item to a "wish list," to an "idea list," to an electronic shopping cart, or to any suitable digital container configured to maintain a number of associations for a period of time (or indefinitely). As another example, the user may be provided user interface elements such as a "like" button, or a "heart" option, in order to provide the user the ability to show interest in an item. Once a number of items have been selected, or at any suitable time, the user may be presented with a user interface option to generate digital content using the selected/associated items. As a non-limiting example, the user may "heart" several items. At any suitable time, perhaps after a particular number of items have been "hearted," the user may be provided the ability to select a user interface element related to generating digital content. Upon selection, electronic representations of the hearted items may be provided within a graphical interface along with a variety of editing options for modifying the digital content. In some embodiments, the electronic representations of the hearted items may each be depicted as a "sticker" over a predetermined background image (or a background image selected/provided by the user). The user may utilize the editing options to modify the background, move/rotate/resize the stickers, add/remove stickers, add text or other graphics, add audio, or any suitable option related to modifying any suitable attribute of the digital content.

In some embodiments, upon selecting the option to generate digital content or at any suitable time, an image data structure may be generated or obtained for each item selected. The image data structures may each identify at least an image of the item. In some embodiments, an image for the item may be obtained from an inventory data store of the electronic marketplace. The image of the item may be modified in some cases to resemble a physical "sticker" where an image of the item is cropped to conform to the shape of the item and a solid colored border added around the perimeter of the item. The "sticker" image may be associated with the image data structure. The image data structure may additionally be configured to store a uniform resource identifier (URI) or another suitable identifier corresponding to a network page associated with the item. By way of example, an image data structure may include a URI that resolves to a network address corresponding to an item detail page (e.g., a network page associated with the item that provides details about the item including any suitable combinations of one or more item images, an item description, one or more item attributes (e.g., weight, dimensions, manufacturer, material of manufacture, etc.), item reviews, or any suitable information related to an item).

Once the user has selected an option to generate digital content, the image data structures corresponding to the items of interest may be associated with a newly-generated content data structure. A content data structure may be configured to maintain data corresponding to any suitable attribute of the digital content. By way of example, a content data structure may identify one or more image data structures, one or more background images, text, audio, color settings, one or more item identifiers, contextual information indicating selections/browsing history of the user occurring prior to generation of the content data structure, and the like. As the user edits the digital content via the provided user interfaces, the modifications may be stored within the content data structure. The content data structure may be stored in any suitable data store and associated with the user for subsequent use.

In some embodiments, one digital content has been generated, the user may be provided the option to share the digital content via any suitable method of electronic communication. By way of example, the user may be provided the option to share the digital content via text messaging, via electronic mail, via one or more social media websites, or the like. The digital content may be provided to one or more additional users according to the sharing method selected. Any suitable interactions and/or alterations by the one or more additional users with the digital content may be stored within the content data structure (or a separate content data structure), as will be described in further detail below. These interactions and/or alterations may be presented to the original author of the digital content at any suitable time.

In some embodiments, the user (or additional users with which the digital content has been shared) may be provided the option to generate additional digital content from previously generated digital content. By way of example, the user may initially generate a party invitation including a number of "stickers" corresponding to various items of the electronic marketplace. Once generated, the user may be provided additional options to generate additional digital content such as polling digital content that may elicit feedback from other users. By way of example, the invitation may include two stickers corresponding to two items of the electronic marketplace. An option to create a poll that elicits votes from other users over which item they prefer may be generated. Additionally or alternatively, digital content that has been shared and presented to other users may be utilized by those users to generate digital content of their own. By way of example, the users may be provided user interface elements to select one or more stickers of the originally presented digital content to generate another instance of digital content which they may author.

In some embodiments, graphical representations of items (e.g., stickers) may be overlaid over a background image utilizing image recognition techniques. By way of example, a user may select a number of items corresponding to various articles of clothing. In some embodiments, these items may each be associated with a digital container such as a wish list, an idea list, a shopping cart, a search result list, or the like. The user may be provided the ability to retrieve or capture an image of a person (e.g., themselves, a friend, etc.) from storage of their user device and/or by utilizing an image capture device (e.g., a camera) of their user device. The image may be analyzed to identify various portions of the subject of the image such as the subject's head, legs, torso, hands, arms, feet, etc. Graphical representations of the items may then be place over corresponding portions of the subject such that an image of a shirt may be overlaid over the subject's torso, an image of a pair of shorts may be placed over the subjects upper legs positioned at the waist, images of shoes may be placed over the subject's feet, and the like. In some embodiments, some graphical representations of items may be placed adjacent to the subject based on a predetermined placement scheme. For example, a backpack or nail polish may be placed adjacent to the subject of the image according to a predetermined placement scheme that defines placement of such items.

As a further example, a user may browse for an item via the electronic marketplace. Upon selecting an option to generate digital content (e.g., via an item detail page, via a search result list, etc.) the user may be provided the ability to select a background image or capture an image via an image capture device. The selected/provided image may be presented as background and the user may be afforded the ability to place a graphical representation of the item within the background image. By way of example, the user may browse to an item detail page corresponding to a light fixture. The user may select an option within the item detail page to generate digital content. In some embodiments, the user may be provided to the ability to retrieve and/or capture an image corresponding to a room in their home. Once provided, the user may be provided a graphical representation of the item that may be positioned by the user within the background image. Accordingly, the user may move the graphical representation to various positions in order to get a visual sense of what the item may look like in the room. In some embodiments, graphical representations of similar items (e.g., other light fixtures, lamps, etc.) may be provided via the same interface. The user may modify the digital content including the background image of the room by adding or removing item images as desired. At any suitable time, the digital content may be stored (e.g., as a content data structure) for subsequent user and/or sharing.

Embodiments discussed herein may provide numerous benefits over conventional systems. For example, the graphical user interfaces discussed herein may provide a user the ability to provide creative input regarding the manner in which data is shared, presented, and/or stored. The techniques described herein provides the user the ability to generate invitations, announcements, posters, catalogs, and the like, to store for later user and/or to share with friends and family in any suitable context (e.g., texts, emails, social media sites, via the electronic marketplace, etc.). Recipients of the digital content may be provided a more engaging manner in which to interact with item data as well as the ability to generate their own digital content.

FIGS. 1-13 will now be discussed to illustrate various user interfaces that may be utilized to generate, share, and/or interact with digital content. It should be appreciated that any digital content discussed in these figures may correspond to a content data structure that defines the digital content. Any image corresponding to an item discussed herein may correspond to an image data structure that defines the attributes associated with the image. Examples of a content data structure and an image data structure are discussed in further detail with respect to FIG. 4.

FIG. 1 illustrates an example user interface 100 for searching for items of interest, in accordance with at least one embodiment. The user interface 100 may depict an idea list generated by another user of the electronic marketplace. Generally, an idea list may include one or more items that the authoring user has previously associated with the idea list. By way of example, the user interface 100 depicts an idea list authored by another user named "Danny." In some embodiments, the idea list may be provided via a network page of an electronic marketplace. It should be appreciated that various user interface elements discussed in connection with the user interface 100 may be differently provided. For example, similar user interface elements may be provided via a search results list (e.g., a network page providing a number of items corresponding to a previously submitted search query), via a wish list (e.g., a network page providing a number of items previously associated with a wish list by a particular user), via an electronic shopping cart, and/or via any suitable network page of an electronic marketplace.

In the example provided in FIG. 1, the user interface 100 includes an image 102 depicting the author of the idea list and/or a title 103 of the idea list. The idea list depicted in the user interface 100 may include any suitable number of items. These items may be displayed textually and/or the items may be displayed graphically such as with an image for each of the items. The images 102-112, for example, may each correspond to an item of the idea list. Each of the images 102-112 may correspond to an image data structure that defines the attributes associated with the image. Each image may initially be displayed with a price (e.g., price 113) associated with the corresponding item. The user may select any suitable image (e.g., image 102). Upon selection, the user may be provided additional item details such as an item name (e.g., Doggy Hot Dog Costume), and item description, shipping costs, provider information, a price, and the like. This item information may be provided via a detail page associated with the item that is configured to display such item details. The detail page may be presented as a pop-up within the user interface 100 or the detail page may be displayed via a separate network page. It should be appreciated that additional items may be associated with the idea list, and the user interface 100 may provide the user the ability to scroll up or down in order to view images of the items of the idea list.

In some embodiments, the user interface 100 may provide user interface elements (e.g., user interface elements 114-118) to enable the user to indicate interest in a particular item. As depicted, these user interface elements may include a heart shaped selection option, although any suitable selection element may be utilized (e.g., check boxes, radio buttons, etc.). Upon selecting user interface element 114 to indicate interest in the item corresponding to image 102, the user interface element 114 may be darkened to indicate the selection. User interface element 116, as depicted, may represent a user interface element that has not been selected.

Figure 2:
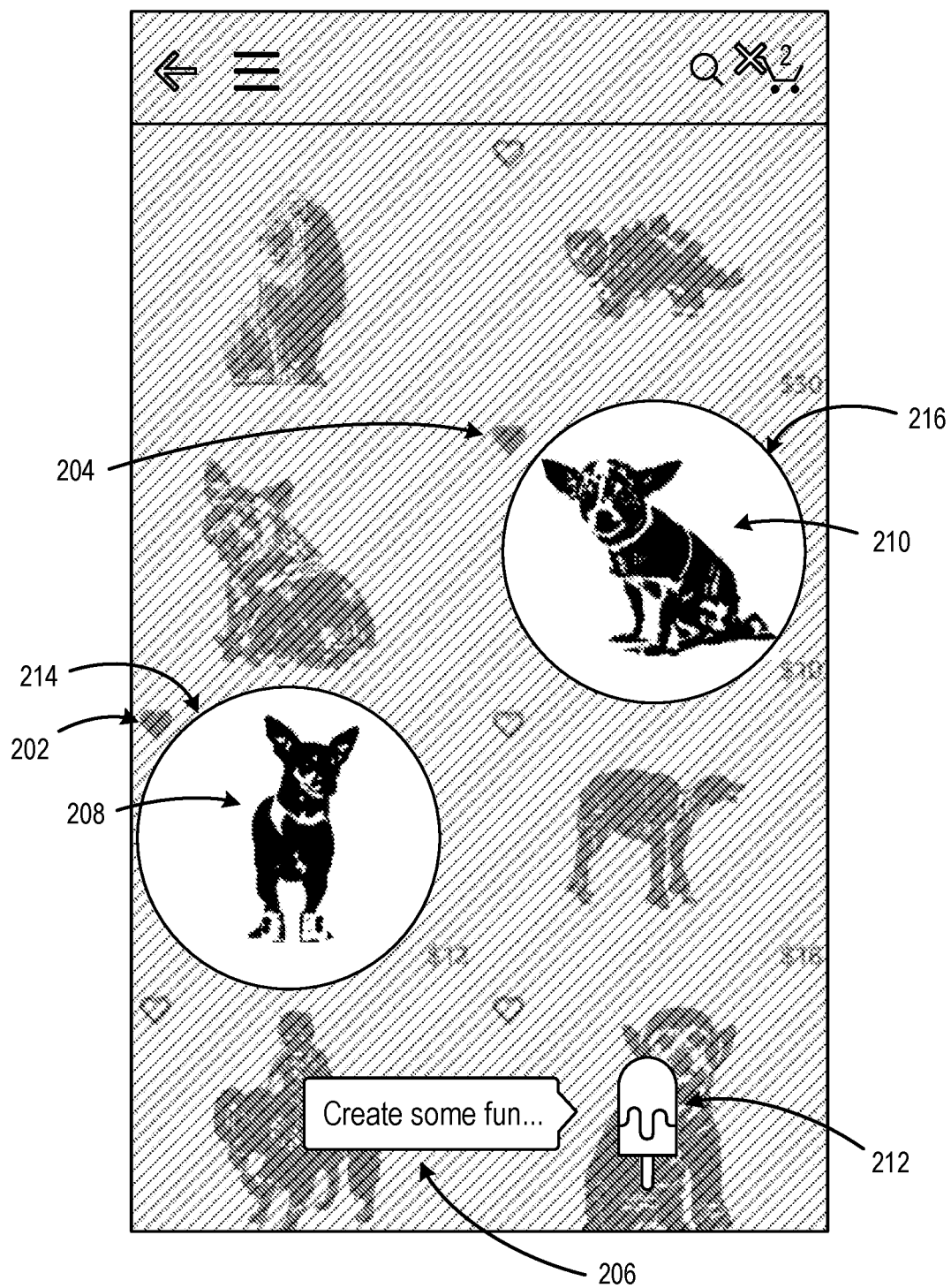
FIG. 2 illustrates an example user interface including a user interface element for generating digital content, in accordance with at least one embodiment.

FIG. 2 illustrates an example user interface 200 including a user interface element for generating digital content, in accordance with at least one embodiment. Continuing with the example of FIG. 1, once a user has selected a number of user interface elements (e.g., user interface elements 202 and 204), content generation interface element 206 may be provided via the user interface 200. The selection of a number items may trigger the content generation interface element 206 to be displayed. This number may vary. For example, in some embodiments, the user may be provided content generation interface element 206 upon selection of a predetermined number of items (e.g., 2, 4, 9, 20, etc.). Additionally, or alternatively, the content generation interface element 206 may be provided according to a predetermined protocol. The protocol may specify a set of rules and/or conditions for providing the content generation interface element 206.

By way of example, the protocol may specify that a user who has never generated digital content should be presented the content generation interface element 206 upon indicating interest in two items. The user may select the user interface element 202 followed by the user interface element 204 indicating an interest in the items corresponding to image 208 and 210, respectively. In accordance with the protocol, the user may be presented with the content generation interface element 206. The content generation interface element 206 may include and/or be displayed with an icon such as icon 212. In some embodiments, upon presenting the user interface element 202, the images 208 and 210 may be highlighted as depicted by areas 214 and 216, respectively. In some embodiments, the background of the user interface 200 may appear shaded in the areas outside the areas 214 and 216 to further highlight the user's selections and the content generation interface element 206 may be presented (along with the icon 212) as depicted in FIG. 2.

The protocol may specify different criteria for presenting the content generation interface element 206 depending on historical user behavior (e.g., whether or not the user has generated digital content before, a number of instances of digital content generated by the user, etc.), contextual information (e.g., a network page type associated with the selections such as an idea list page, a wish list page, a search result page, etc.), or the like. By way of example, it may be the case that the user has previously generated digital content utilizing the content generation interface element 206. In this scenario, the user may not be presented the content generation interface element 206 until a greater number of items are selected, or upon entering particular user input (e.g., right click on a mouse, a particular gesture provided via a touch screen of the user device, etc.). In some embodiments, the content generation interface element 206 may alternatively be provided as part of the user interface 200 at a docked location such that the content generation interface element 206 is selectable by the user at any suitable time. Whether the content generation interface element 206 is provided at a docked location within the user interface 200 may also depend on historical user behavior and/or contextual information. For example, the content generation interface element 206 may be positioned at a docked location within the user interface 200 if the user is known to have previously generated digital content.

Figure 3:
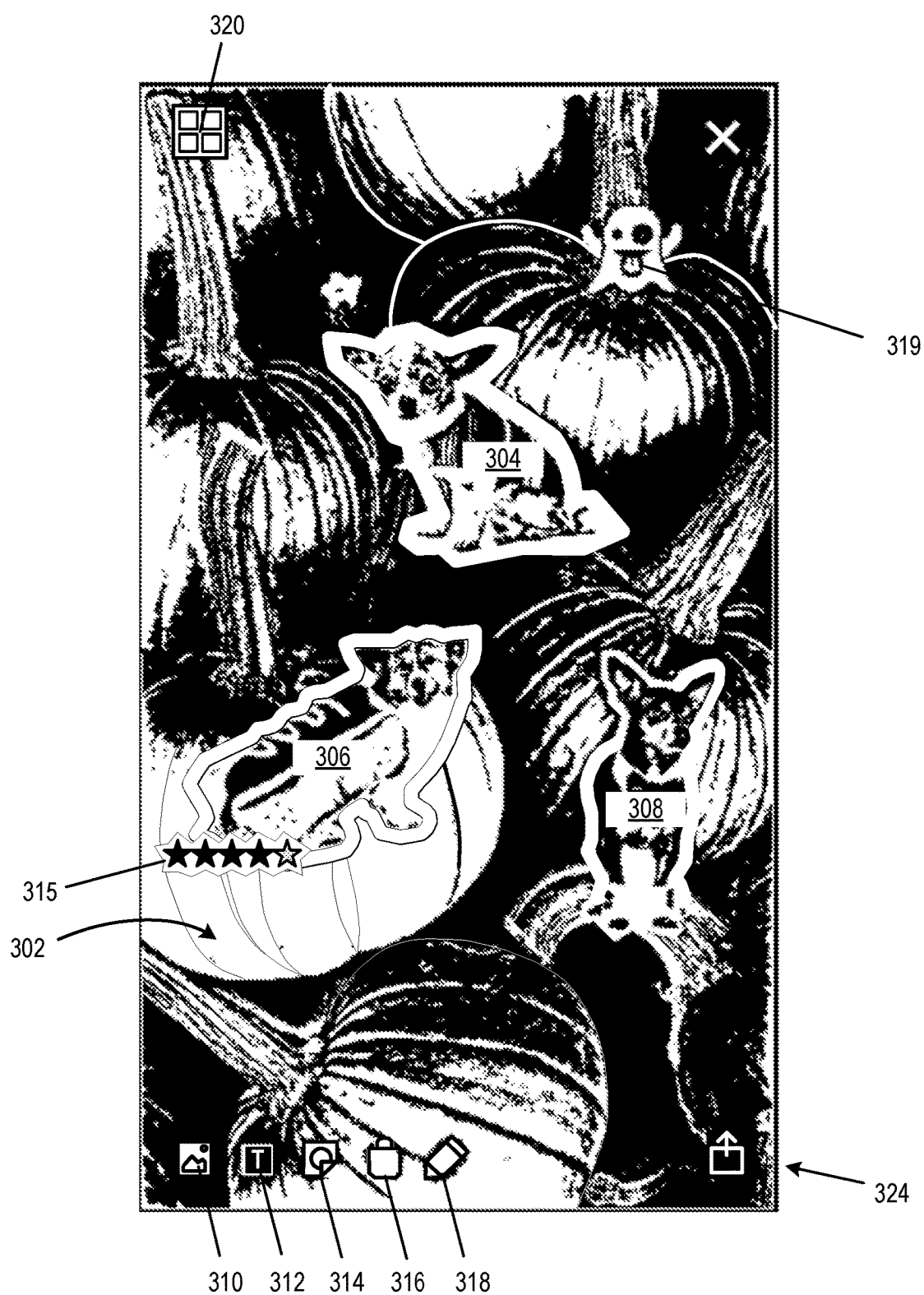
FIG. 3 illustrates an example user interface for editing digital content, in accordance with at least one embodiment.

FIG. 3 illustrates an example user interface 300 for editing digital content, in accordance with at least one embodiment. Continuing on with the examples provided in FIGS. 1 and 2, the user interface 300 may be provided in response to selection of the content generation interface element 206 of FIG. 2.

In some embodiments, the user interface 300 may present a background image 302 and images 304, 306, and 308, corresponding to the items/images selected utilizing the user interface 100. In some embodiments, the images 304-308 may depict a graphical representation of an item that resembles a physical sticker. It should be appreciated that although the images 304-308 may depict physical items in the example provided in FIG. 3, it is contemplated that images 304-308 may correspond to digital items such as music (e.g., songs, albums, etc.), movies, television shows, electronic books, and the like. The images 304-308 may be previously generated from images associated with items of the electronic marketplace or any suitable combination of the images 304-308 may be generated in response to selection of the content generation interface element 206 of FIG. 2. Each of the images 304-308 may be associated with a corresponding image data structure that specifies attributes associated with the images 304-308. Upon selection of the content generation interface element 206, a content data structure may be generated to store attributes associated with the digital content. The content data structure may be updated to include the images 304-308 and/or references to the images 304-308.

In some embodiments, image data structure 402 of FIG. 4 may include any suitable combination of attributes including, but not limited to, an image data structure identifier, an item identifier corresponding to the item, a supplemental webpage link (e.g., corresponding to an item detail page of the electronic marketplace associated with the item, or any suitable webpage identifier), an identifier and/or location of an image of the item, an associated application programming interface (API), action instructions, or the like, or any suitable combination of the above. In some embodiments, the item identifier may be utilized to retrieve item attributes, while in other embodiments, one or more item attributes (e.g., a ratings value, a price, a title, a brand name, a sales ranking, one or more reviews, or any suitable attribute related to the item) may be stored within the image data structure 402. Accordingly, one or more item attributes may be retrievable directed from the image data structure 402 without an additional lookup of the item being performed.

The image data structure 402 may be generated at any suitable time. By way of example, as an item is added to the inventory of an electronic marketplace, an image data structure may be generated and associated with the item. In some embodiments, generation of the image data structure may include processing one or more images of an item. In some embodiments, these images may be provided by a resource provider (e.g., a merchant) upon creating a listing for the item within the electronic marketplace. At least one of these images may be processed to create an image that depicts a "sticker" of the item (e.g., image 306 of FIG. 3). For example, the provided image may be cropped to conform to an outline of the item and a solid colored border (e.g., a white border) may be added of a predetermined width. In some embodiments, the image may be cropped without provided an additional border. Once generated, the image may be stored at a location (e.g., associated with a URI) and/or within a data store accessible to the electronic marketplace. The image data structure 402 may be utilized to store a variety of attributes.

The image data structure 402 may be an example of an image data structure corresponding to image 304 of FIG. 3. The image data structure 402 associated with the image 304 may include an image data structure identifier (e.g., "475"). An image data structure identifier may be any suitable alphanumeric value unique to the image data structure 402. In some embodiments, the image data structure 402 may be retrieved from a data store utilizing the image data structure identifier and/or an item identifier (e.g., 19E57) for a corresponding item. The item identifier may be any suitable alphanumeric value that identifies the item within the electronic marketplace. In some embodiments, the image data structure may include any suitable number of item attributes (e.g., item attribute 1 corresponding to a price of "$15.99" and item attribute 2 corresponding to a ratings value "5"). In some embodiments, the image data structure may include a reference to another image data structure (e.g., image "505"). The image data structure 402 may further include an image location (e.g., http://www.marketplace.com/images/image475.com") from which the generated image (e.g., a "sticker") of the item may be retrieved. Although not depicted, the generated image of the item may be stored within the image data structure 402 according to any suitable format. In some embodiments, the generated image may be associated with an image identifier (e.g., any suitable alphanumeric value). In some embodiments, this image identifier may be included in the image data structure 402 and may be utilized to retrieve the generated image from a data store of previously generated images.

The image data structure 402 may include a supplemental webpage link. In some embodiments, the supplemental webpage link may be in the form of a URI that identifies a network page that provides various details about the item, although it should be appreciated that the supplemental webpage may be in any suitable form and may provide any suitable data whether the data is associated with an item or not.

The image data structure 402 may include a defined action. For example, it may be the case that particular operations are to be performed on selection of the image (or a portion of the image) within the interface 300. Accordingly, the image data structure 402 may include a definition and/or instructions specifying the operations to be executed and/or an API to be utilized for performing such operations. It should be appreciated that image data structure 402 is intended to be illustrative in nature. The image data structure may be any suitable data storage container, object, list, mapping, or the like configured to store any suitable attribute related to a generated image of an item.

As another non-limiting example, the image data structure 402 may relate to a "sticker" associated with digital content such as a musical song. In this scenario, the image data structure 402 may include an image data structure identifier, an item identifier corresponding to the song, one or more item attributes (e.g., a sales ranking, a title, a price, etc.), a location and/or identifier with which an image (e.g., a sticker) corresponding to the song may be retrieved, a supplemental webpage link corresponding to a webpage from which a preview of the song may be played, or an action corresponding to instructions for playing a preview of the song within the interface 300. Thus, in some embodiments, selection of the sticker may cause the song to be played either via the same interface in which selection occurred, or via a network page to which the user is navigated upon selection of the sticker.

As yet another example, the image data structure 402 may correspond to a "sticker" provided by the system related to performing a particular action. For example, the image data structure 402 may correspond to an image associated with a ratings scheme. In some embodiments, the image may include 5 stars, although any suitable rating scheme may be utilized (e.g., a scale of 1 out of 10, etc.). The image data structure 402 may include an image data structure identifier. In some embodiments, an item identifier may be assigned to the image data structure 402 based at least in part on a proximity of placement to another image within the interface 300. By way of example, the image data structure 402 corresponding to an image of the 5 star rating scheme may be associated with the item data structure corresponding to image 304 when the image of the 5 star rating system is placed within a threshold distance of the image 304. The threshold distance may be predefined and may be any suitable distance. In some embodiments, the association between two item data structures may be stored in one or more of the image data structures (e.g., a reference to the image data structure of the item may be stored in the image data structure corresponding to the image of the 5 stars).

In some embodiments, the image data structure 402 corresponding to the 5 star ratings scheme may include an action which defines a particular API to be called utilizing any suitable user input provided at the user interface 300 (e.g., user input provided at the image corresponding to the 5 star ratings scheme). As a non-limiting example, the user may select any suitable location within the image of the 5 stars, or one or more stars to indicate a rating for the item. In some embodiments, any suitable user input may be utilized and provided via an API as defined within the image data structure 402. Accordingly, user input provided at the image (e.g., a 5 star sticker) may be utilized to update an overall rating for the item within the electronic marketplace. In other examples, the user input may be stored within the image data structure (e.g., as an additional data field) and the electronic marketplace may retrieve the information at any suitable time in order to update an overall rating for the item. It should be appreciated that any suitable functionality for updating information at the electronic marketplace may be achieved utilizing user input provided with an image associated with image data structure 402 including, but not limited to, providing a product review and/or updating item information (e.g., price, title, etc.).

In some embodiments, content data structure 404 of FIG. 4 may be configured to store any suitable attribute associated with digital content. By way of example, the content data structure 404 may include any suitable combination of: a content data structure identifier, a background image identifier, one or more image data structure identifiers, positional data associated with the image data structure identifiers, contextual information, or the like. The content data structure 404 may be generated at any suitable time. By way of example, the content data structure 404 may be generated upon selection of the content generation interface element 206 of FIG. 2. In some embodiments, the content data structure 404 may store any suitable number of image data structure identifiers corresponding to the images to be included in the digital content. In some embodiments, contextual information such as navigational data and/or user selection data may be stored and/or associated with the content data structure 404. The associated contextual information may indicate user selections made prior to selection of the content generation interface element 206, network pages visited prior to the selection of the content generation interface element 206, a type of network page from which the content generation interface element 206 was selected, or the like.

The content data structure 404 may be an example of a content data structure corresponding to the digital content of FIG. 3. Content data structure 404 may include an content data structure identifier (e.g., "Content19847"). A content data structure identifier may be any suitable alphanumeric value unique to the content data structure 404 with which the content data structure 404 may be retrieved. The content data structure 404 may include a background image identifier that identifies a background image of the digital content. In some embodiments, the background image identifier may be any suitable alphanumeric value unique to the background image with which the background image is retrievable. In some embodiments, the background image identifier may correspond to a URI that identifies a storage location of the background image. The content data structure 404 may include any suitable number of image data structure identifiers corresponding to any suitable number of images to be included in the digital content. By way of example, the content data structure 404 may correspond to the digital content of FIG. 3. Accordingly, the content data structure 404 may include 3 image data structure identifiers corresponding to images 304-308 of FIG. 3. Location information corresponding to each of the images 304-308 may be associated with a corresponding image data structure identifier. As a non-limiting example, the content data structure 404 may include an association to a first image data structure that corresponds with image 304 of FIG. 3. The image data structure may be associated with an image data structure identifier (e.g., 475 corresponding to the image data structure 402 that stored corresponding attributes associated with the image 304). In some embodiments, location, sizing, and/or orientation data may be associated with the image data structure identifier to indicate a location, size, and/or orientation of the corresponding image (e.g., image 304) within the digital content. By way of example, a location may be provided as coordinates (e.g., X1, Y1) indicating a relative location within the background image at which the image 304 has been placed. Although not depicted, any suitable information indicating a size associated with the image 304 and/or an orientation (e.g., rotated 20 degrees clockwise) may be associated with the image data structure identifier. In some embodiments, contextual information may be stored within the content data structure 404. The contextual information may indicate user selections made prior to selection of the content generation interface element 206 (that resulted in the generation of the content data structure 404), network pages visited prior to the selection of the content generation interface element 206, a type of network page from which the content generation interface element 206 was selected, or the like.

Although not depicted, the content data structure 404 may include any suitable information related to a color scheme of the digital content, textual data (e.g., actual text, font, size, color, and/or positional data indicating a location of the text within the digital content), or the like. Generally, the content data structure 404 identifies and describes any suitable component (e.g., images, background, positioning, color scheme, textual data, etc.) of the digital content such that the digital content may be recreated from the data contained in the content data structure 404.

Returning to FIG. 3, the user interface 300 may further include any suitable number and/or combination of user interface options (e.g., user interface options 310-324). For example, selection of the user interface option 310 may provide the user additional background options. Upon selecting this option, the user may select from a number of previously generated background images. These background images may depict various themes (e.g., holidays, events, seasons, etc.). In some embodiments, the selectable background images may include background images previously provided by the user. In some examples, the user may be provided the option to add a newly captured image as the background image. Once captured, the background image may be stored as an association with the user (e.g., via a user profile of the electronic marketplace) such that the background image may be utilized/selectable for subsequent digital content generation. Additionally, the content data structure corresponding to the digital content may be updated to include the background image and/or a reference to the background image (e.g., a pointer, a background image identifier, etc.).

Selection of user interface option 312 may enable the user to add text to the digital content. In some embodiments, the user may be provided the ability to select the font and/or the font size from, for example, a pop-up menu provided within the user interface 300. Text may be placed as desired within the user interface 300 and may be rotated and/or situated in any suitable manner.

Selection of the user interface option 314 may enable the user to access additional images (e.g., stickers) corresponding to additional items, non-interactive stickers (e.g., images that depict a static image and/or an animation for which selection results in no additional action being taken) such as ghost sticker 319, or any suitable number and/or type of predefined sticker. By way of example, selection of the user interface option 314 may enable the user to select a "review sticker" (not depicted). The review sticker may be placed adjacent (or atop) any of the images 304-308. For example, the review sticker may be placed within a threshold distance of the image 304. Upon placement, or at another suitable time, the review sticker may be associated with the image data structure corresponding to the image 304 and/or the item identifier corresponding to the item associated with the image 304. The authoring user and/or subsequent recipients of the digital content may then provide a review utilizing the review sticker by adding text. The text input provided by the user may then be utilized to update the reviews for the item within the electronic marketplace. This review may be provided upon user entry, or the review may be retrieved at any suitable time by the electronic marketplace system.

As another non-limiting example, selection of the user interface option 314 may enable the user to access a "ratings" sticker 315. The ratings sticker 315 may be in any suitable form. By way of example, the ratings sticker 315 may include 5 stars, each corresponding to a rating of a 5 star rating scheme. Similar to the review sticker discussed above, the ratings sticker 315 may be placed adjacent to (or atop) any of the images 304-308. By way of example, the ratings sticker may be placed within a threshold distance of the image 306 as depicted in FIG. 3. Upon placement, or at another suitable time, the ratings sticker 315 may be associated with the image data structure corresponding to the image 306 and/or the item identifier corresponding to the item associated with the image 306. As discussed above in connection with FIG. 4, the authoring user, or a subsequent recipient of the digital content depicted in FIG. 3 may select any suitable location and/or star within the ratings sticker 315 to submit user input corresponding to a rating for the item depicted by the image 306. The rating may be utilized to update an overall rating for the item corresponding to image 306 upon receipt of the user input or at any suitable time. In some embodiments, the user input corresponding to the rating may be stored within the image data structure corresponding to the rating sticker 315 for later retrieval by the electronic marketplace during an update process for the ratings corresponding to the item.

Selection of the user interface option 316 may enable the user to search for other items within the electronic marketplace. These items may include other items from the idea list depicted in FIG. 1. In some embodiments, these items may include related and/or similar items from the electronic marketplace. By way of example, any suitable technique for identifying similar items to the items corresponding to images 304-308 may be identified within the electronic marketplace. In some embodiments, upon identification, or at any suitable time, an image for these items may be generated and may be accessible for selection by the user after selecting the user interface option 316. By way of example, each similar item may be depicted by a corresponding image (e.g., a sticker) within a popup window or some portion of the user interface 300 from which the user may select. These additional images may be added to the digital content depicted in FIG. 3 as desired.

Selection of the user interface option 318 may enable the user to modify the digital content by drawing on the digital content. Upon selection of this option, the user may select a line style/width/color that may be utilized for drawing the lines according to the user's input. Upon adding text, the content data structure corresponding to the digital content may be updated to include the attributes associated with the added text.

User interface option 320 may be included within the user interface 300 to enable the user to view a gallery of previously generated digital content. Upon selection of the user interface option 320, the user may be navigated to a webpage associated with his user account. Within the webpage, the user may view his own previously generated digital content. In some embodiments, the user may view digital content which has been previously shared with him but authored by other users. In at least one embodiment, the user may interact with the digital content within the gallery in any suitable manner. By way of example, the user may select previously generated digital content to edit the content. In this scenario, the user may be presented the user interface 300 with which edits may be made. In still further embodiments, the user may associate any suitable number of previously generated digital content with one another via the gallery webpage. By way of example, the user could create the digital content as depicted in FIG. 3. At another time, the user could create additional digital content that depicts items associated with cat costumes. In some embodiments, the user may view both of these instances of digital content within the gallery and an option for associating the two may be provided. Accordingly, the user may create a digital catalog for sharing. Upon sharing the associated digital content, the recipient may "flip" through the digital content much like a physical catalog. It should be appreciated that any suitable number of instances of digital content may be associated with one another and arranged in any suitable manner and/or order.

Each of the images 304-308 of FIG. 3 (and rating sticker 315) may individually be associated with an image data structure (e.g., separate instances of the image data structure 402 of FIG. 4). The digital content depicted in FIG. 3 that includes the images 304-308 may be associated with a content data structure (e.g., the content data structure 404 of FIG. 4). It should be appreciated that, in any example provided herein, an image of an item (e.g., a sticker) may individually be an example of an image data structure (e.g., the image data structure 402) and any suitable example of digital content provided herein may be associated with an instance of a content data structure (e.g., the content data structure 404). Accordingly, any functionality discussed in FIGS. 3 and 4 may be similarly applied to any of the examples of FIGS. 5-13.

Figure 5:
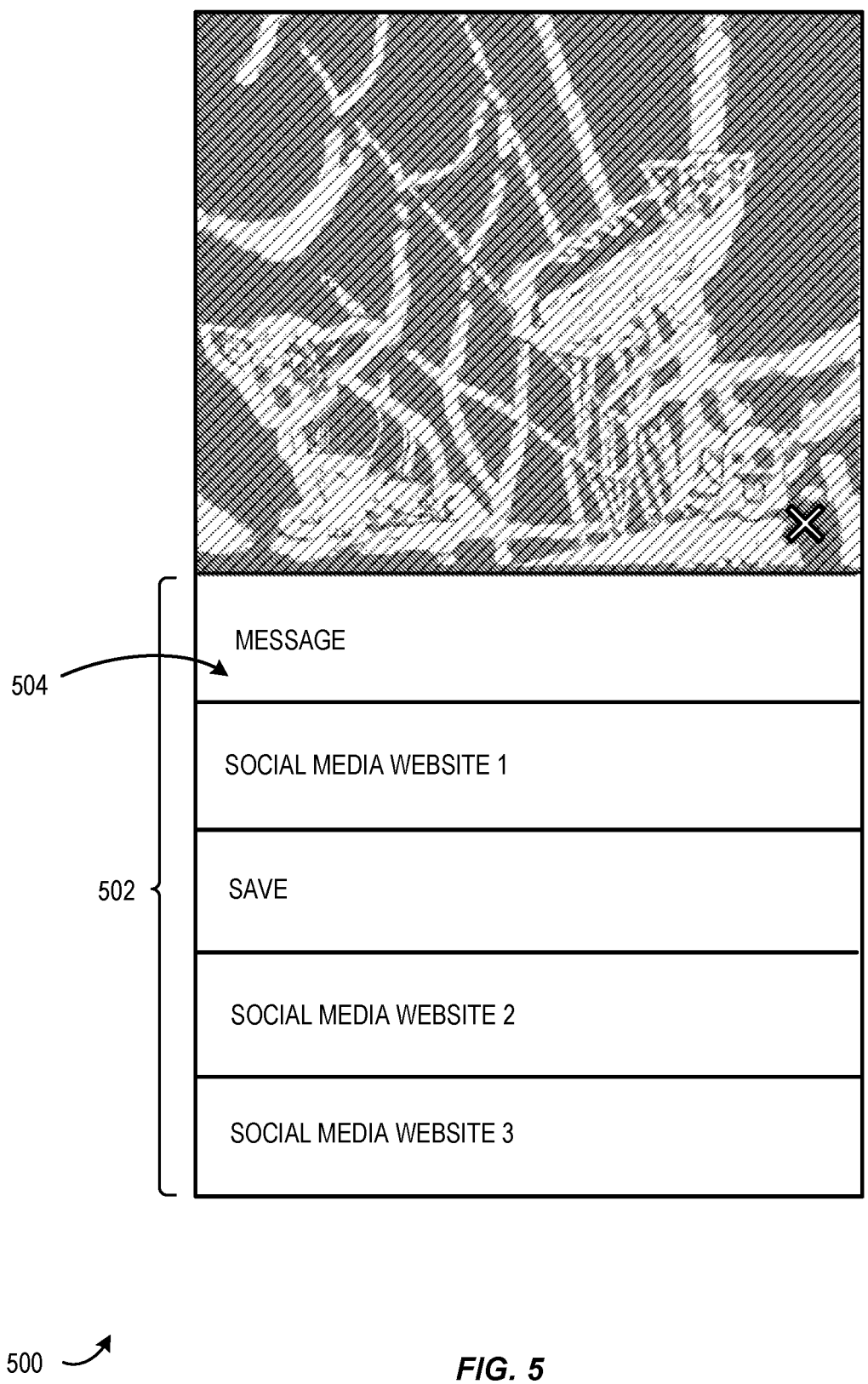
FIG. 5 illustrates an example user interface including a selectable option to generate additional digital content, in accordance with at least one embodiment.

In some embodiments, the user interface 300 may include user interface element 324. Upon selecting the user interface element 324 of FIG. 3, the user may be presented with an additional user interface for selecting a method to share and/or store the digital content generated via user interface 300. FIG. 5 illustrates an example user interface 500 for providing one or more options 502. FIG. 5 is intended to be illustrative in nature. It should be appreciated that more or fewer options may be presented via the user interface 500. The options 502 may include any suitable combination of: one or more options to share the digital content via a particular social media website, an option to save the digital content, an option to send the digital content to one or more users via text messaging or electronic mail, or the like.

In some embodiments, the options 502 may be ordered according to user preference. By way of example, if the current user has historical shared digital content via text messaging more often than sharing digital content via a particular social media website (e.g., "social media website 1"), the option for sharing via text messaging may be presented more prominently (e.g., higher in a list) than an option to share the digital content via the particular social media website. In other words, the options 502 may be ordered according to a likelihood that the user will select the option over other options based on the user's historical behavior.

As a non-limiting example, a user may select an option to text the digital content to one or more users by selecting option 504. Upon identifying the recipient (or more than one recipient) of the digital content, the system may be configured to transmit the digital content to the identified recipient (s) via text message.

Figure 6:
FIG. 6 illustrates an example of digital content as presented at a recipient device, in accordance with at least one embodiment

FIG. 6 illustrates an example of digital content 600 as presented at a recipient device, in accordance with at least one embodiment. In some embodiments, the digital content 600 may be provided as a static image (e.g., an image that is not modifiable). By way of example, if the digital content 600 was texted to the recipient device, the digital content 600 may be presented as a static image. Similarly, if the digital content 600 was shared via a social media website (e.g., via a page associated with the content's author) the digital content 600 may be provided as a static image. The digital content 600 may be selectable and/or a URI may be provided with the digital content 600 in order to navigate the recipient (or an interested party) to a network page. The digital content 600 may be presented within the network page with various user interface elements with which the viewer may interact. When provided as a static image, selection of the images 602-606 may have no effect. When viewing the digital content 600 via a network page, the user may interact with the images 602-606. For example, upon selecting the image 602, the user may be provided additional item details regarding the item depicted in the image 602. Upon selecting the image 602, an image data structure may be utilized to identify an item detail page and/or an item identifier associated with the image 602. The item detail page may be provided to display the item details and/or the item details may be retrieved from the system utilizing the item identifier. In some embodiments, the item details may be overlaid over the digital content 600 within the current network page, or the user may be navigated to a different network page (e.g., an item detail page) for the item associated with the image 602. The images 604 and 606 may similarly be selectable and corresponding item details may be presented in any suitable manner upon selection utilizing data contained in the corresponding image data structures.

In some embodiments, the recipient user may utilize any suitable component of the digital content 600 for generating additional digital content. As a simplistic example, the user may indicate a desire to create an instance of digital content using the image 602. This desire may be provided via any suitable user input. Once indicated, a new instance of digital content may be created and populated/associated with the image 602. The user may be provided any suitable interface (e.g., a user interface similar to the user interface 300 of FIG. 3) for editing the newly created digital content. For example, the user may modify the background image of their digital content, add/remote/modify/reposition images with the digital content, add text, or the like in any suitable manner as described above in connection with FIG. 3.

Figure 7:
FIG. 7 illustrates another example user interface for generating digital content, in accordance with at least one embodiment.

FIG. 7 illustrates an example user interface 700 including a selectable option to generate additional digital content, in accordance with at least one embodiment. In some embodiments, digital content 702 may be generated by a user utilizing the techniques described above in connection with FIG. 3. At any suitable time (e.g., subsequent to saving the digital content 702) the user may be provided with a user interface element 704. As depicted, the user interface element 704 may correspond to an option to create a poll from the digital content 702. In some embodiments, selection of the user interface element 704 may modify the digital content 702 to indicate that the digital content 702 is to be used to for elicit user feedback from one or more recipients.

As a non-limiting example, upon selecting the user interface element 704, the user may be presented with an ability to select one or more of the images of digital content 702. For example, the user may select image 706 and image 708. Upon making such selections, the user may be presented with the user interface 800 of FIG. 8.

Figure 8:
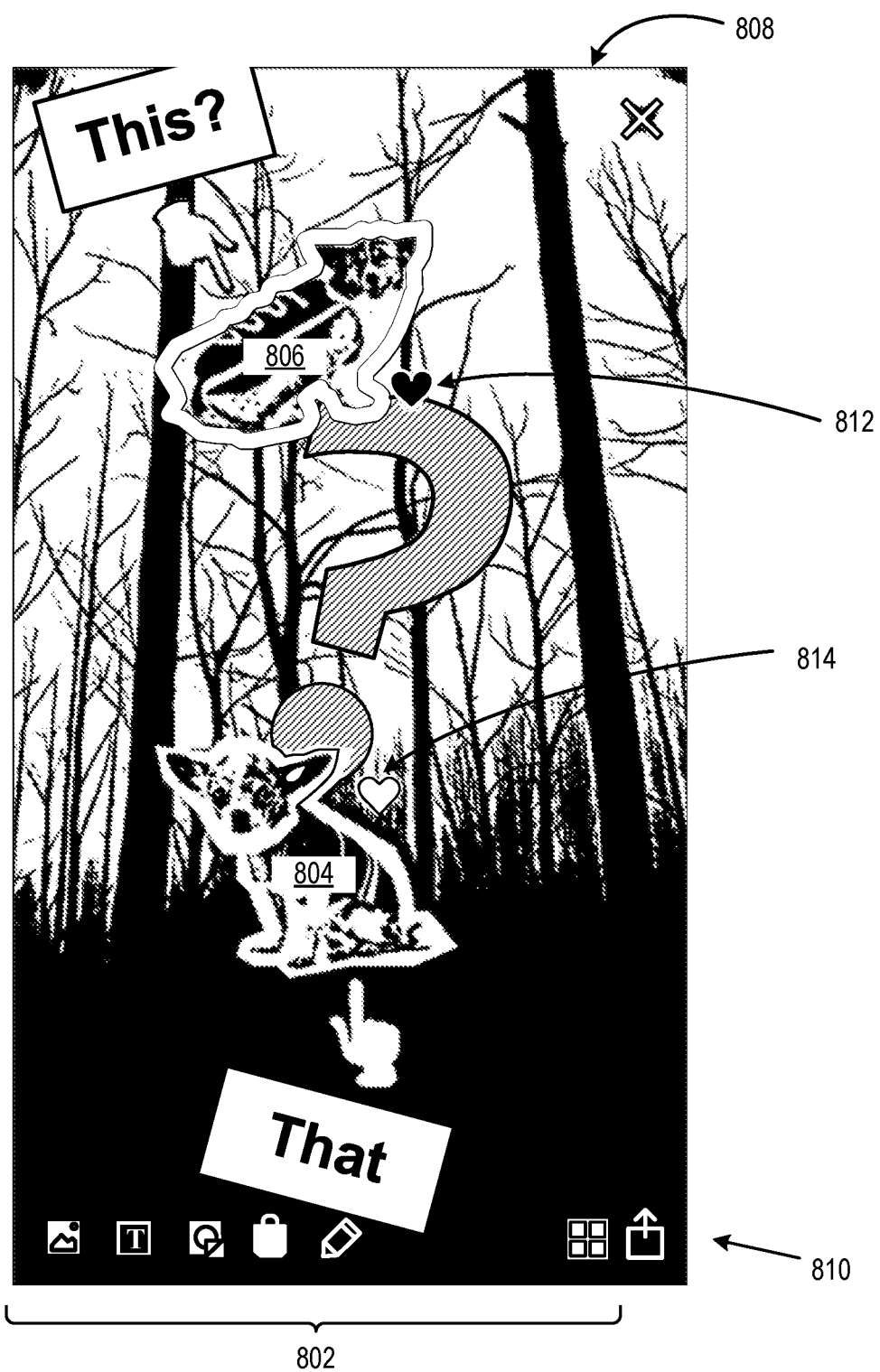
FIG. 8 illustrates another example user interface for editing digital content, in accordance with at least one embodiment.

FIG. 8 illustrates another example user interface 800 for editing digital content, in accordance with at least one embodiment. User interface 800 may be similar to user interface 300 and may include user interface options 802. User interface options 802 may be similar to the user interface options 310-320 of FIG. 3 and may provide similar functionality as that described above in connection with FIG. 3. By way of example, the image 804 (e.g., corresponding to the image 706 of FIG. 7) and the image 806 (e.g., corresponding to image 708 of FIG. 7) may be included in digital content 808. The user may modify the digital content 808 in any suitable manner such as by repositioning the images 804 and 806, modifying the background image of the digital content 808, or the like. As depicted in FIG. 8, additional graphical elements (e.g., pointing icons) and/or textual elements (e.g., text boxes including "This?" and "That") may be provided within the digital content automatically based at least in part on selection of the user interface element 704 of FIG. 7. In some embodiments, the user may reposition these additional elements as desired.

The user interface 800 may include user interface element 810 (e.g., an example of the user interface element 324 of FIG. 3). Upon selecting the user interface element 810, the user may be presented with an additional user interface (e.g., user interface 500) for selecting a method to share and/or store the digital content 808 as generated via the user interface 800. Upon selecting a sharing method (e.g., via the user interface 500), the digital content 808 may be presented to a recipient in a similar manner as discussed above in connection with FIG. 6. When presented to a recipient, the digital content 808 may include user interface elements 812 and 814. Although depicted as heart shaped, the user interface elements 812 and 814 may be in any suitable form such as a check box, radio button, or the like. The recipient user may select one of the user interface elements 812 or 814 to indicate a preference. By way of example, the recipient user may select user interface element 812 to indicate that he prefers the item corresponding to image 806 over the item corresponding to the image 804.

Any suitable feedback (e.g., selections corresponding to the user interface element 812 or 814) provided by any suitable number of recipients may be stored within the content data structure corresponding to the digital content 808. By way of example, if the digital content 808 was provided to 10 recipients, 4 recipients selected the user interface option 814, and 6 recipients selected the user interface option 812, the aggregate count of those selections may be stored within the content data structure corresponding to the digital content 808. The aggregate counts may be presented to the author of the digital content 808 at any suitable time. By way of example, the aggregate counts may be transmitted to the user via text, email, or any suitable electronic means. In some embodiments, the author may visit a gallery provided by the electronic marketplace to view previously generated digital content. Within the gallery, the author may view the digital content 808. Upon viewing the digital content, the user may be presented the aggregate counts provided as feedback. In some embodiments, the system may wait a predetermined period of time and/or for a predetermined participation percentage (e.g., 80% of the recipient users have provided feedback) before providing the aggregate counts or making the aggregate counts viewable.

Figure 9:
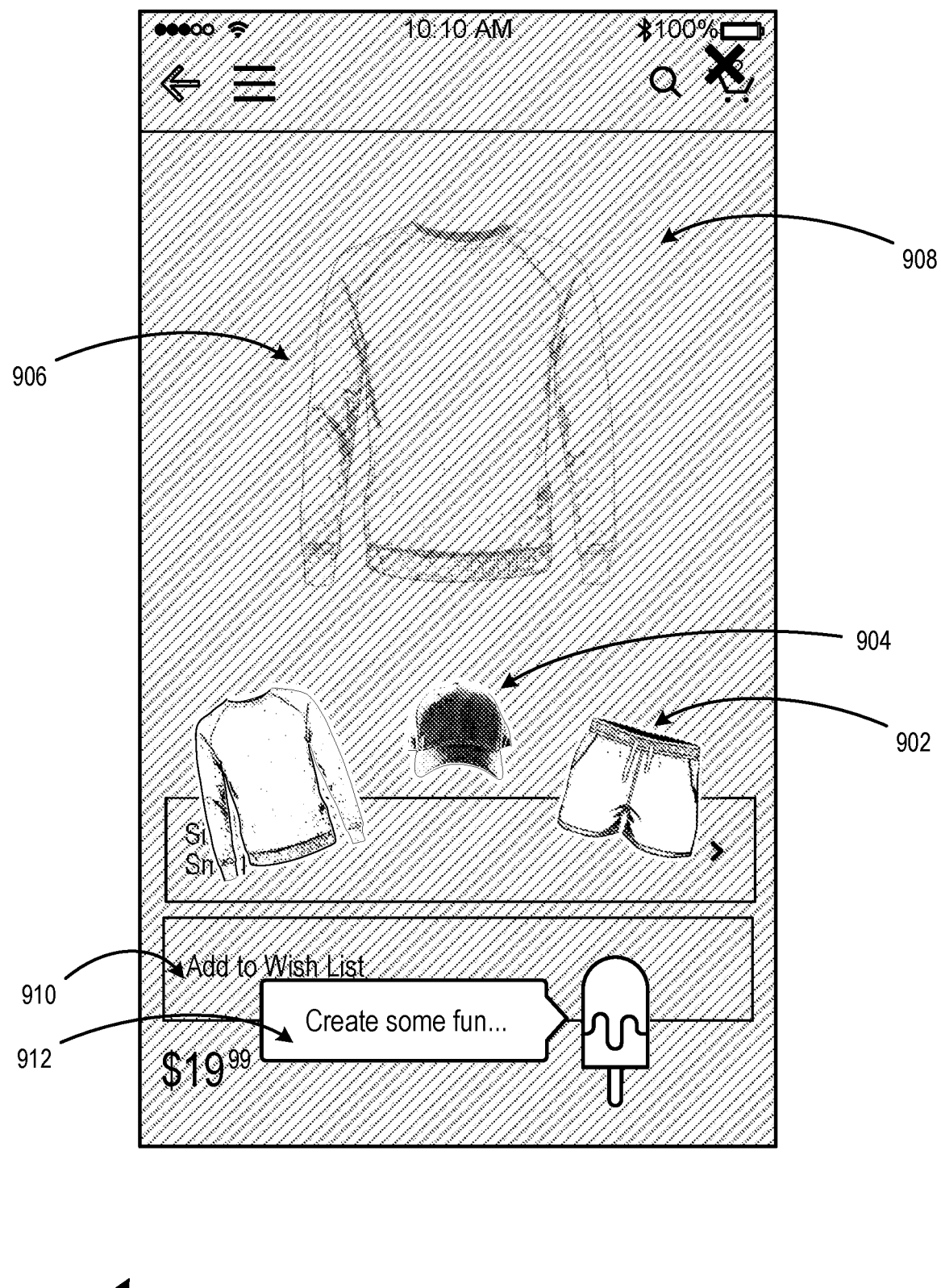
FIG. 9 illustrates additional user interface for generating digital content, in accordance with at least one embodiment.

FIG. 9 illustrates additional user interface 900 for generating digital content, in accordance with at least one embodiment. In some embodiments, the user may utilize any suitable interface of the electronic marketplace to select one or more items. By way of example, the user can search for various articles of clothing (or other types of items) and add these items to a wish list and/or an idea list or otherwise associate these items with any suitable digital container provided by the electronic marketplace. These items may be utilized at any suitable time to generate digital content.

As a non-limiting example, the user may utilize any suitable user interfaces of the electronic marketplace to view items 902 and 904. Using any suitable option provided by the electronic marketplace, the user may add items 902 and 904 to a wish list. Subsequently, the user may search for item 906 and select an option to view network page 908 (e.g., an item detail page associated with the item 906). Within the network page 908, the user may be presented user interface option 910 to add item 906 to the same wish list already containing associations to items 902 and 904. Upon selection the user interface option 910 (or at any suitable time), the user may be presented with user interface option 912. In some embodiments, images corresponding to the items 902, 904, and 906 may be generated upon being added to the wish list and these images may be presented adjacent to the user interface option 912 as depicted in FIG. 9. These images may individually correspond to an image data structure (e.g., the image data structure 402 of FIG. 4) that maintains information related to the item and/or the image of the item. It should be appreciated that more or fewer images associated with items of the wish list (or other digital container) may be presented depending on the number of items associated with the wish list. In some embodiments, an image corresponding to every item contained in the wish list may be presented or a subset of the images (e.g., corresponding to the most recently added 3 items, the most recently added 4 items, 3 random items of the wish list, 5 most often revisited items of the wish list, etc.) may be presented with the user interface option 912. These images, as described above, may be generated from any suitable image associated with the corresponding items. For example, an image of the item may be cropped such that the borders of the image correspond with the perimeter of the item.

Figure 10:
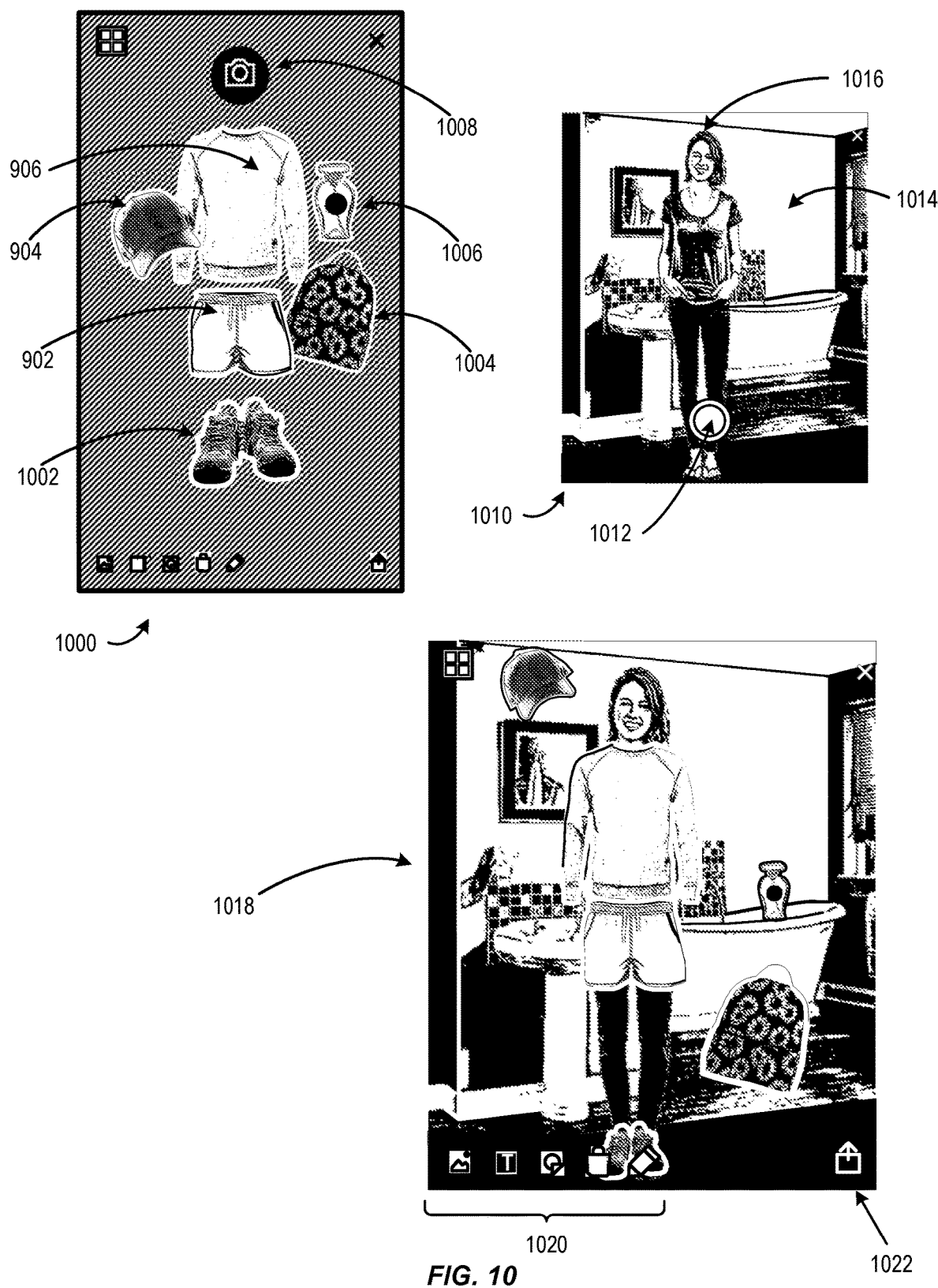
FIG. 10 illustrates an example user interface for editing digital content, in accordance with at least one embodiment.

Upon selecting the user interface option 912, a content data structure may be created and the user interface 1000 of FIG. 10 may be presented. Upon creation, the content data structure may be updated to include references to each of the image data structures corresponding to the items 902, 904, 906, 1002, 1004, and 1008 and their corresponding positions within a background image. The content data structure may initial be defaulted to reference a predetermined background image.

FIG. 10 illustrates an example user interface 1000 for editing digital content, in accordance with at least one embodiment. In some embodiments, user interface 1000 may present one or more images corresponding to one or more items associated with a digital container (e.g., a shopping cart, a wish list, an idea list, etc.) of the electronic marketplace. The digital container may be associated with the user.

As depicted in FIG. 10, user interface 1000 presents a set of images corresponding to items of a wish list. It should be appreciated that corresponding images for every item of the digital container (e.g., a wish list, an idea list, a digital shopping cart, etc.) may be presented, or a subset of images corresponding to a subset of items of the digital container may be presented. By way of example, upon selecting the user interface option 912, a category type (e.g., clothing) of the item 906 of FIG. 9 may be determined. In some embodiments, the category type may be utilized by the system to identify other items of the digital container which share a same or similar category. A mapping indicating similar category types may be maintained by the system for this purpose. For example, the mapping may indicate that "clothing" is similar to a category type "backpack," and a category type "shoes."

In some embodiments, items 902, 904, 906, 1002, 1004, and 1006 may each be associated with the same digital container (although additional items may be also be associated the digital container). Based on the category type "clothing" of the item 906, and the consideration that the user interface option 912 was selected from the detail page corresponding to the item 906, items 902, 904, may be selected from the digital container due to the category type of those items also corresponding to "clothing." In some embodiments, item 1002, and 1004 may also be selected based at least in part on a determination that the category type "clothing" is similar to the category types "shoes" and "backpack" associated with items 1002 and 1004, respectively. In some embodiments, item 1006 may be selected based at least in part on being associated with the same digital container as the item 906, irrespective of the category types.

It should be appreciated that process for item selection may vary. The system may utilize other techniques for selecting items from the digital container. For example, a predetermined protocol may specify that when a most recently added item (e.g., item 906) is added to a digital container, other items are to be selected based on a predetermined scheme. By way of example, the item 906 may be associated with an item attribute identifying the item as a "sweater." The predetermined protocol may specify that when the item is a "sweater," an item having a particular attribute such as "pants," "shorts," or "skirt," should be selected if one is associated with the digital container. The predetermined protocol may specify selection based on other criteria such as color, style, material, or any suitable attribute of the items associated with the digital container. For example, the protocol may specify that if the item is a yellow shirt, blue pants/shorts/skirt is to be selected if one is associated with the digital container. Any suitable number of items may be selected based on any suitable rules defined by the protocol.

Images corresponding to the selected items (e.g., items 902, 904, 906, 1002, 1004, and 1006) may be presented via user interface 1000. The placement of these images may conform to a predefined placement scheme. The placement scheme for the example of FIG. 10 may specify that the images of the items are arranged/placed in the manner depicted in FIG. 10. Some of these placements may present items in a manner in which they'd be worn on a person. A placement schemes may be utilized for any suitable combination of images corresponding to the selected items. Placement scheme for non-clothing related items may differ from placement schemes for clothing related items.

The user interface 1000 may include a capture option 1008. Capture option 1008 may correspond to an option to capture an image utilizing a capture device of the user device being utilized to view the user interface 1000. Upon selecting the capture option 1008, the user may be provided user interface 1010, including a capture element 1012. Upon selecting capture element 1012, the image capture device may be triggered to capture the image 1014. As a non-limiting example, the image 1014 may include a subject 1016. The subject 1016 may, for example, be an image of the user.

Upon capturing the image 1014, or at another suitable time, the user may be returned to user interface 1000. The image 1014 may be analyzed to identify one or more body parts of the subject 1016 (e.g., a torso, legs, feet, etc.) utilizing any suitable image recognition techniques. In addition to body parts, any suitable features of the image 1014 may be identified utilizing image recognition techniques. For example, counters, tables, surfaces, coat racks, or any suitable object may be identified. The particular features of the image 1014 identified may depend on the particular items selected for presentation in user interface 1000. By way of example, the torso of subject 1016 may be identified based at least in part on determining that the item 906 is associated with a person's torso. Attributes of the item 906 may indicate this relationship. Once particular features of the image 1014 and/or subject 1016 are identified, placement and/or orientation of the items 902, 904, 906, 1002, 1004, and 1006 may be identified and the content data structure defining the digital content may be updated to indicate these placements and/or orientations.

Once the user is returned to the user interface 1000, the items 902, 904, 906, 1002, 1004, and 1006 may be placed according to the identified features of the image 1014 as depicted at 1018 and in accordance with the data specified in the content data structure. By way of example the item 902 may be overlaid over the torso of subject 1016, item 902 may be overlaid over the upper legs of the subject 1016 near the waist of the subject 1016, item 1002 may be overlaid over the feet of the subject 1016. In some embodiments, the item 1006 may be overlaid over image 1014 at an area identified as a surface within the image 1014. In some embodiments, items 904 and 1004 may be placed as depicted at a location identified via any suitable predetermined placement protocol. The user may alter the placement of the images of the items as desired using any suitable editing options which may be provided via the user interface 1000 (e.g., editing options 1020). The user may then opt to share the digital content as depicted at 1018 (or as modified by the user) with one or more users by selecting the option 1022. Selection of the option 1022 may present the user with user interface 500 of FIG. 5 (or a similar interface) for sharing the digital content with other users.

Once a sharing method has been selected and recipients identified (if required), one or more recipient users may view the digital content as depicted at 1018. In some embodiments, the image may be presented statically with a URI that navigates the recipient to a network page where he may manipulate the placement of the items and/or add/remove items to/from the digital content. In some embodiments, the URI alone is presented initially. A recipient who has altered the digital content may be provided the option to send those changes back to the original author of the image.

Figure 11:
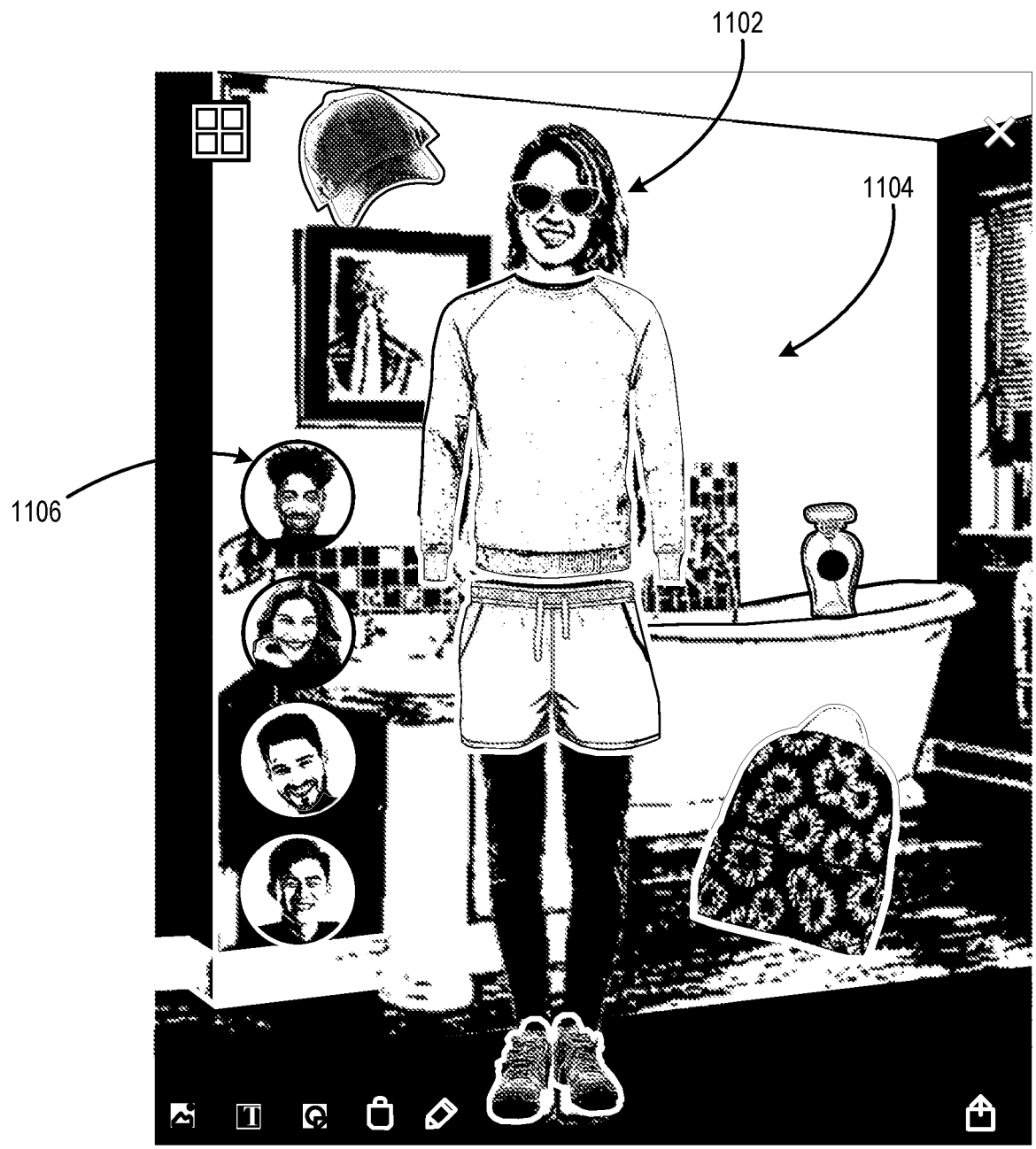
FIG. 11 illustrates an example user interface for presenting feedback corresponding to previously shared digital content, in accordance with at least one embodiment.

FIG. 11 illustrates an example user interface 1100 for presenting feedback corresponding to previously shared digital content, in accordance with at least one embodiment. Once an image has been shared, feedback related to the image may be presented via user interface 1100. By way of example, an authoring user may send digital content as depicted at 1018 in FIG. 10. A recipient user ("Bob") may receive the digital content and alter the digital content to add item 1102. In some embodiments, a new content data structure (e.g., an example of the content data structure 404 of FIG. 4) may be created for the recipient user's version of the digital content. Any suitable interface may be provided to the recipient user in order to remove, move, rotate, and/or resize any image associated within the digital content. Any suitable user interface may be provided to enable the recipient user to add an image corresponding to an item that was previously not included in the digital content. As the digital content is modified, the content data structure may be updated accordingly. The recipient user may opt to send the altered version digital content (depicted at 1104) back to the authoring user. In response to an indication that the recipient user desires to transmit the altered version of the digital content, the current content data structure defining the recipient's version of the digital content may be provided to the device of the authoring user.

User interface 1100 may depict feedback provided by one or more recipients of the digital content. In some embodiments, the user interface 1100 may include one or more selection options (e.g., selection option 1106). Each selection option may correspond to particular feedback (e.g., particular content data structures) provided by a particular recipient user. Upon selection of the selection option 1106 corresponding to a particular recipient user, the user may be provided the digital content as depicted at 1104 which corresponds to a content data structure as provided by that particular recipient user. The selection options may be in any suitable form and may include icons, images (e.g., an image of the recipient user providing feedback), text, a checkbox, radio button, or the like.

FIG. 12 illustrates yet another example user interface 1200 for generating digital content, in accordance with at least one embodiment. The user interface 1200 depicts a detail page associated with an item (e.g., a light fixture corresponding to image 1202). Within the detail page associated with the item, user interface option 1204 may be provided. Although depicted within a carrousel of images of the item, the user interface option 1204 may be provided in any suitable manner within the detail page (e.g., as a button, checkbox, radio button, or the like).

Upon selecting the user interface option 1204, the user may be presented with the option to retrieve a stored image and/or capture a new image using a capture device (e.g., a camera) of their user device (e.g., the user's smartphone). The user may utilize this functionality to capture image 1206

(e.g., an image depicting a room of the user's home). At any suitable time (e.g., upon selection of the user interface option 1204, upon capture of the image 1206, etc.) a content data structure may be generated. The content data structure may be updated to include the image 1206 and/or a reference to the image 1206.

Upon capturing the image 1206, the user may be presented user interface 1210. Within the user interface 1210 an image 1202 of the item may be provided. The image 1202 may be generated at any suitable time (e.g., after selection of the user interface option 1204), or the image 1202 may be previously existing and retrieved at any suitable time. In some embodiments, the image 1206 may be analyzed to identify placement for the image 1202. For example, given that the item is a light fixture, the image 1206 may be analyzed to identify a preexisting light fixture and/or a ceiling surface of the room. The image 1202 may then be placed over the preexisting light fixture or at least positioned as if connected to the ceiling. In some embodiments, the image 1202 may be presented at a predetermined location (e.g., the center of the image 1206) for placement by the user. In some embodiments, the user may select user interface option 1212 to search for additional items within the user interface 1210. Upon placement of the image 1202 within the image 1206, the content data structure corresponding to the digital content may be updated to indicate placement and/or orientation of the image 1202 within the digital content.

Figure 13:
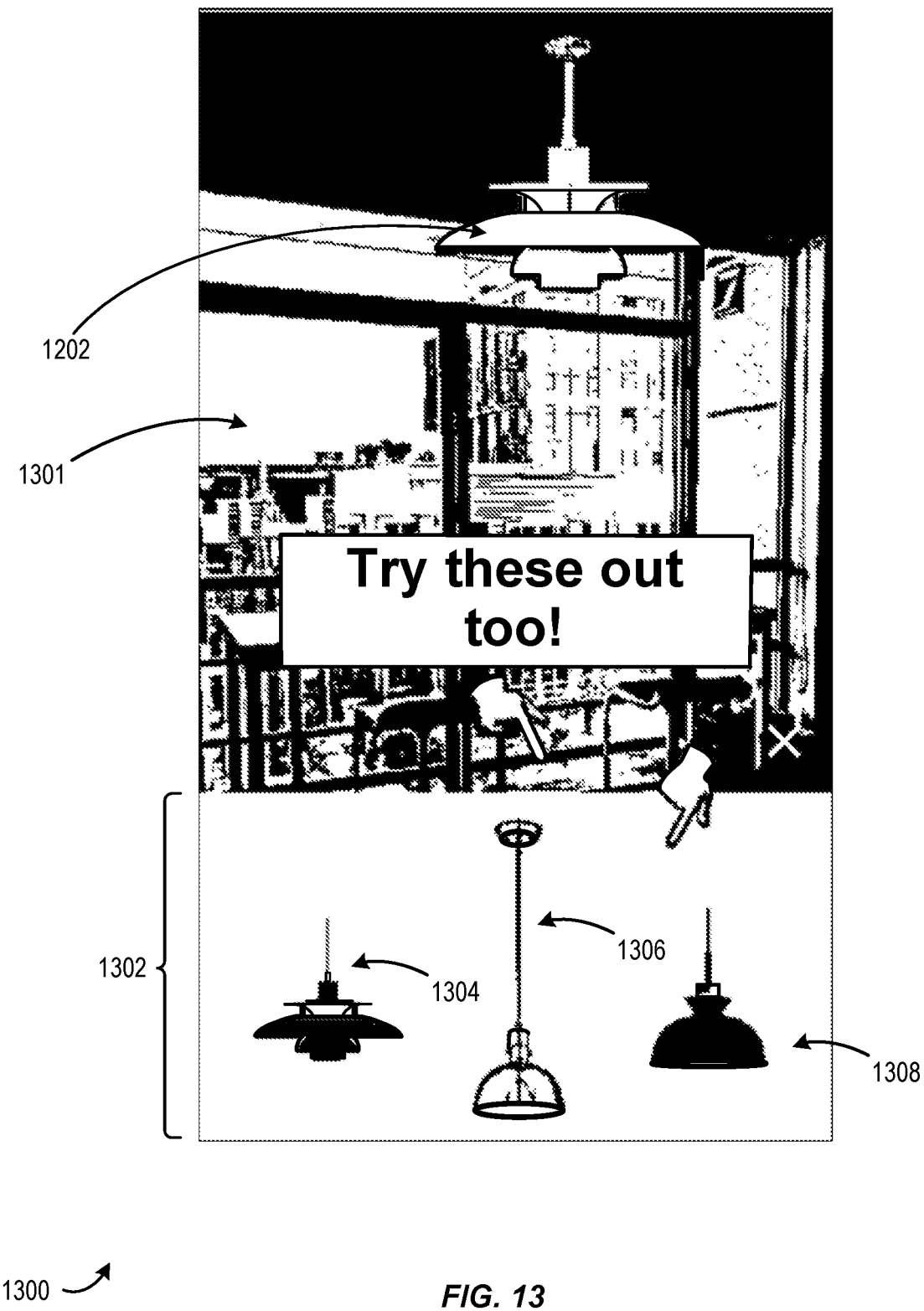
FIG. 13 illustrates yet another example user interface for editing digital content, in accordance with at least one embodiment.

FIG. 13 illustrates yet another example user interface 1300 for editing digital content, in accordance with at least one embodiment. In some embodiments, user interface 1300 may be presented upon selection of the user interface option 1212 of FIG. 12.

Within user interface 1300, a number of additional items may be presented (e.g., within an area 1302 of the user interface 1300). These items may be identified based on a search conducted by the user at the user interface 1300 (e.g., via a search query input option not depicted). In some embodiments, the additional items may be identified based at least in part on being similar to the item associated with the image 1202. Any suitable technique for identifying similar items may be utilized to identify the additional items. Images 1304, 1306, and 1308, each corresponding to an identified similar item may be presented. It should be appreciated that additional images may be provided that correspond to additional items identified to be similar and the user interface 1300 may enable the user to scroll through these images within area 1302. Each image may be associated with a corresponding image data structure. Accordingly, each image may be associated with a browse-able link (e.g., an identifier associated with an item detail page for the item within the electronic marketplace). Selection of any one of the images 1202, 1304, 1306, 1308 may cause the user to be navigated to the network page (e.g., the item detail page) associated with the image.

In some embodiments, the user interface 1300 may be utilized to move the image 1202 within the digital content 1301. The digital content 1301 may be stored within a content data structure (e.g., the content data structure 404). The user interface 1300 may additionally, or alternatively enable removing the image 1202 and/or adding one or more of the images 1304, 1306, and/or 1308. As the digital content 1301 is altered, the corresponding content data structure may be updated to include the modifications. By way of example, should the image 1202 be removed from the digital content, the content data structure corresponding to the digital content may be updated to remove a reference to the image 1202, the item corresponding to the image 1202, and/or a reference to an image data structure corresponding the image 1202. Similarly, should the image 1304 be added to the digital content 1301, the content data structure corresponding to the digital content may be updated to include a reference to the image 1304, the item corresponding to the image 1304, and/or a reference to an image data structure corresponding the image 1304.

Figure 14:
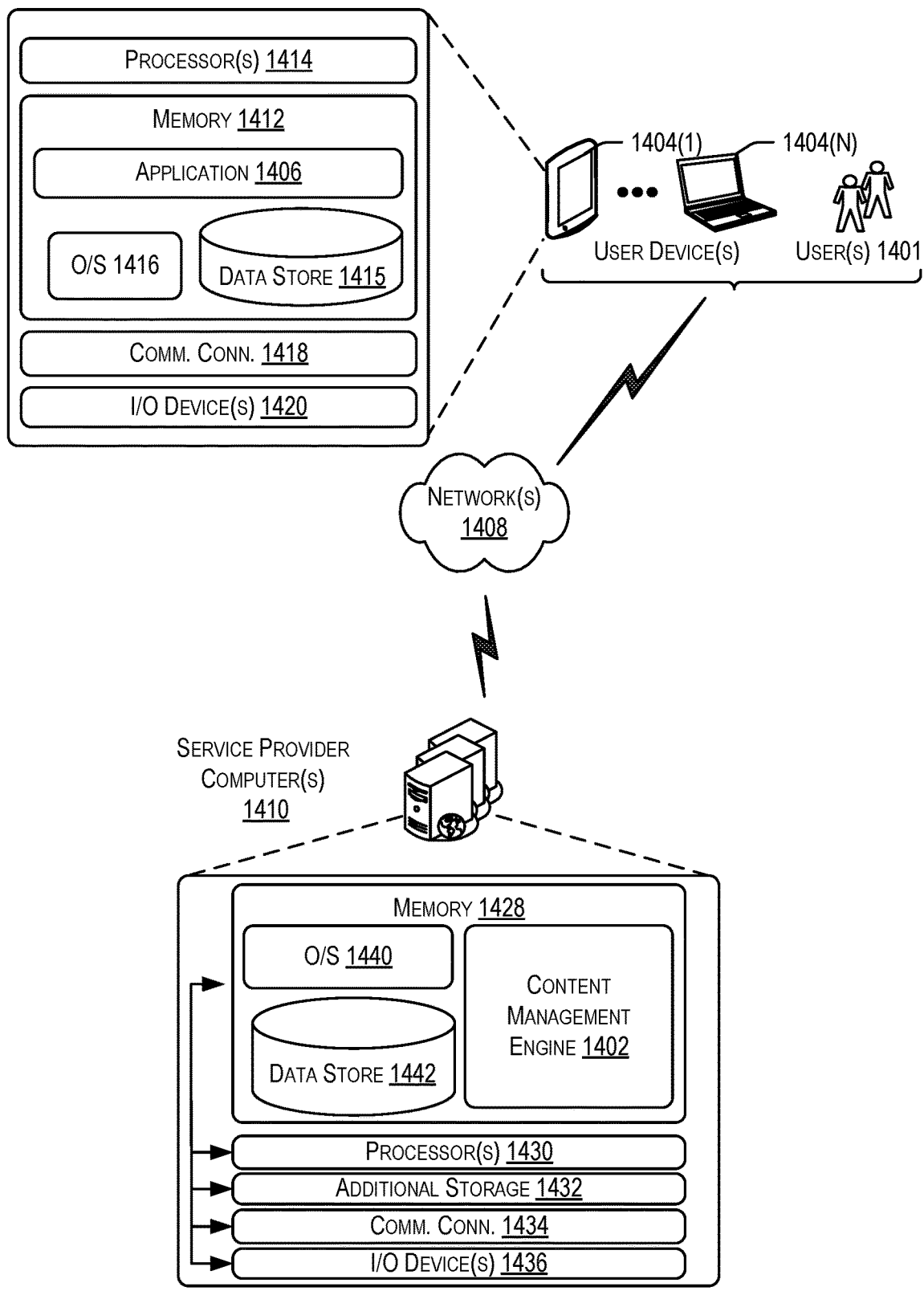
FIG. 14 illustrates components of a content management system according to at least one embodiment.

FIG. 14 illustrates components of a system 1400 according to at least one embodiment. In system 1400, one or more user(s) 1401 may utilize one or more user device(s) 1404 (1)-(N) (e.g., any suitable computing device such as a smartphone, a tablet, a laptop, a desktop computer, etc.) to navigate to one or more network pages associated with an electronic marketplace. The application 406 may be utilized to access any suitable network page of an electronic marketplace and/or access to any of the user interfaces discussed herein in order to provide the functionality discussed herein.

The content management engine 1402 may, in some embodiments, be a component of the system 1400. In some embodiments, the content management engine 1402 may provide any of the user interface described above in FIGS. 1-13 and perform any suitable operations to provide any suitable functionality described in connection with the those interfaces. The content management engine 1402 may be operate at the user device(s) 1404 and/or some portion of the content management engine 1402 may operate at the service provider computer(s) 1410. In some embodiments, the user device(s) 1404 and service provider computer(s) 1410 may communicate via networks 1408 via the application 1406 and/or through various application programming interfaces (APIs). In some aspects, the application 1406 operating on the user device(s) 1404, and/or the APIs, may be hosted, managed, and/or provided by a computing resources service or service provider, such as by utilizing one or more service provider computer(s) 1410.

In some examples, the network(s) 1408 may include any one or a combination of many different types of networks, such as cable networks, the Internet, wireless networks, cellular networks, and other private and/or public networks. It should be appreciated that the described techniques may apply in other client/server arrangements, as well as in non-client/server arrangements (e.g., locally stored applications, etc.).

The service provider computer(s) 1410, perhaps arranged in a cluster of servers or as a server farm, may host the application 406 operating on the user device(s) 1404 and/or cloud-based software services. Other server architectures may also be used to host the application 1406 and/or cloud-based software services. The application 1406 operating on the user device(s) 1404 may be capable of handling requests from the user(s) 1401 and serving, in response, various user interfaces that can be rendered at the user device(s) 1404. The application 1406 operating on the user device(s) 1404 can present any suitable type of network page and/or interface (e.g., the user interfaces 100-1300) that supports generating, editing, and/or viewing digital content. The described techniques can similarly be implemented outside of the application 1406, such as with other applications running on the user device(s) 1404.

The user device(s) 1404 may be any suitable type of computing device such as, but not limited to a touch screen device, a smartphone, a personal digital assistant (PDA), a laptop computer, a desktop computer, a thin-client device, a wearable device (e.g., a smart watch), a tablet PC, an electronic book (e-book) reader, a music player device, etc. In some examples, the user device(s) 1404 may be in communication with the service provider computer(s) 1410 via the network(s) 1408, or via other network connections.

In one illustrative configuration, the user device(s) 1404 may include at least one memory 1412 and one or more processing units (or processor(s)) 1414. The processor(s) 1414 may be implemented as appropriate in hardware, computer-executable instructions, firmware, or combinations thereof. Computer-executable instruction or firmware implementations of the processor(s) 1414 may include computer-executable or machine-executable instructions written in any suitable programming language to perform the various functions described.

The memory 1412 may store program instructions that are loadable and executable on the processor(s) 1414, as well as data generated during the execution of these programs. Depending on the configuration and type of user computing device, the memory 1412 may be volatile (such as random access memory (RAM)) and/or non-volatile (such as read-only memory (ROM), flash memory, etc.). The user device(s) 1404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1412 may include multiple different types of memory, such as static random access memory (SRAM), dynamic random access memory (DRAM), or ROM.

Turning to the contents of the memory 1412 in more detail, the memory 1412 may include an operating system 1416, one or more data stores 1415, and one or more application programs, modules, or services for implementing the features of the content management engine 1402 disclosed herein, provided via the application 1406 (e.g., a browser application, a digital content application, an audio player application, a gaming application, an electronic book reading application, etc.). The application 1406 may be configured to receive, store, and/or display a network page or other interface for interacting with the service provider computer(s) 1410. Additionally, the memory 1412 and/or the data store 1415 may be configured to store any suitable digital content data such the data discussed above in connection with image data structure 402 and/or content data structure 404 of FIG. 4. In some embodiments, the user device(s) 1404 may be configured to provide digital content data to the service provider computer(s) 1410 at any suitable time for further processing.

The user device(s) 1404 may also contain communications connection(s) 1418 that allow the user device(s) 1404 to communicate with a stored database, another computing device or server (e.g., the service provider computer(s) 1410), user terminals and/or other devices on the network(s) 1408. The user device(s) 1404 may also include I/O device(s) 1420, such as a keyboard, a mouse, a pen, a voice input device, a touch input device, a display, speakers, a printer, etc.

In some aspects, the service provider computer(s) 1410 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1410 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 1410 may be in communication with the user device(s) 1404 and/or other service providers via the network(s) 1408 or via other network connections. The service provider computer(s) 1410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 1410 may include at least one memory 1428 and one or more processing units (or processor(s)) 1430. The processor(s) 1430 may be implemented as appropriate in hardware, computer-executable instructions, firmware, or combinations thereof. Computer-executable instruction or firmware implementations of the processor(s) 1430 may include computer-executable or machine-executable instructions written in any suitable programming language to perform the various functions described.

The memory 1428 may store program instructions that are loadable and executable on the processor(s) 430, as well as data generated during the execution of these programs. Depending on the configuration and type of service provider computer(s) 1410, the memory 1428 may be volatile (such as RAM) and/or non-volatile (such as ROM, flash memory, etc.). The service provider computer(s) 1410 or servers may also include additional storage 1432, which may include removable storage and/or non-removable storage. The additional storage 1432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1428 may include multiple different types of memory, such as SRAM, DRAM, or ROM.

The memory 1428, the additional storage 1432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1428 and the additional storage 1432 are all examples of computer storage media. Additional types of computer storage media that may be present in the service provider computer(s) 1410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 1410 may also contain communications connection(s) 1434 that allow the service provider computer(s) 1410 to communicate with a stored database, another computing device (e.g., the user device(s) 1404) or server, user terminals and/or other devices on the network(s) 1408. The service provider computer(s) 1410 may also include I/O device(s) 1436, such as a keyboard, a mouse, a pen, a voice input device, a touch input device, a display, speakers, a printer, etc.

Turning to the contents of the memory 1428 in more detail, the memory 1428 may include an operating system 1440, one or more data stores 1442, and/or one or more application programs, modules, or services for implementing the features disclosed herein, such as the features provided by the content management engine 1402.

Figure 15:
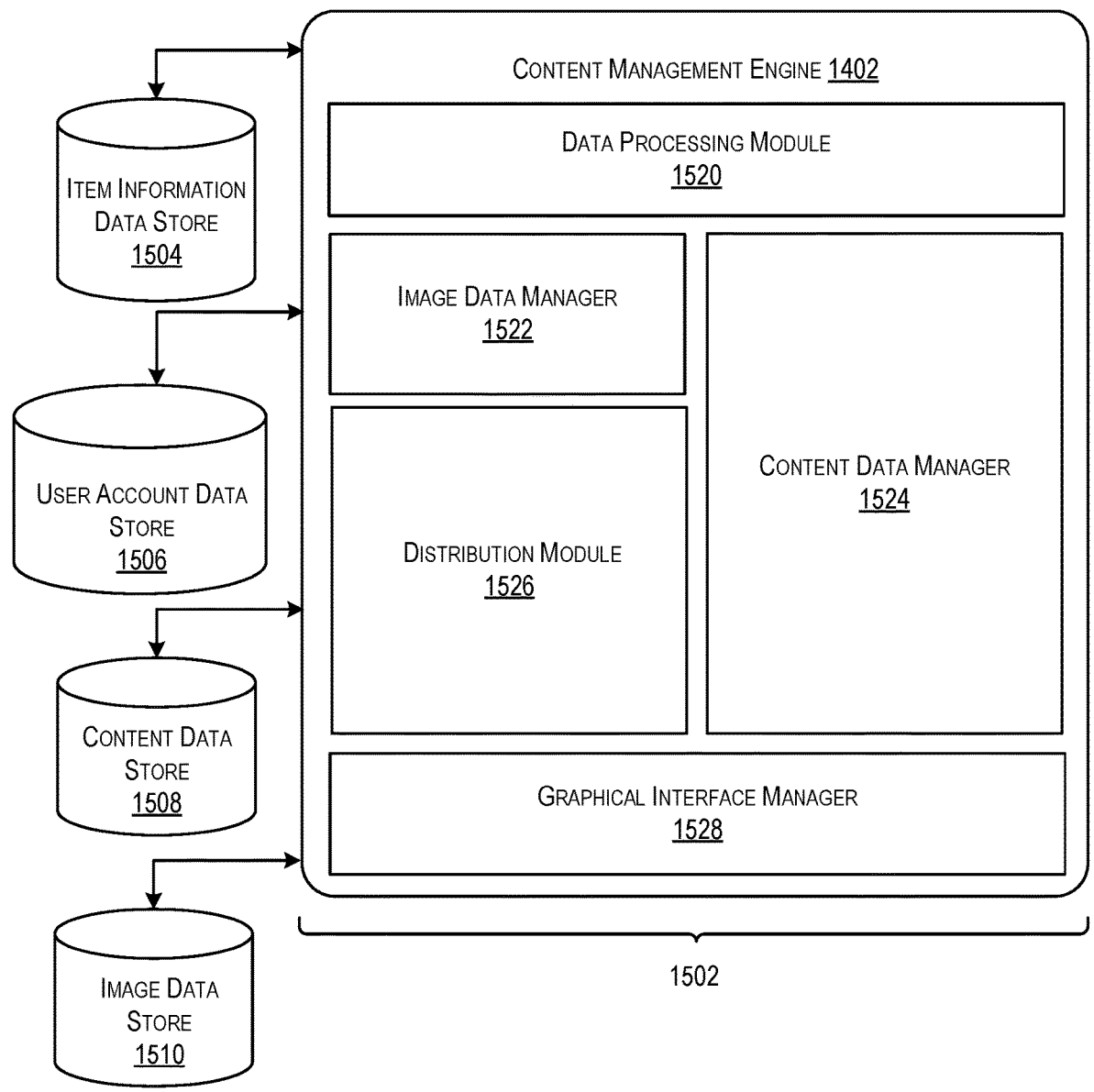
FIG. 15 is a schematic diagram of an example computer architecture for a content management engine, including a plurality of modules that may perform functions in accordance with at least one embodiment.

FIG. 15 is a schematic diagram of an example computer architecture 1500 for the content management engine 1402, including a plurality of modules 1502 that may perform functions in accordance with at least one embodiment. The modules 1502 may be software modules, hardware modules, or a combination thereof. If the modules 1502 are software modules, the modules 1502 can be embodied on a computer readable medium and processed by a processor in any of the computer systems described herein. It should be noted that any module or data store described herein, may be, in some embodiments, be a service responsible for managing data of the type required to make corresponding calculations. The modules 1502 may be exist as part of the content management engine 1402 operating on the service provider computer(s) 1410 of FIG. 14, or the modules 1502 may exist as separate modules or services external to the service provider computer(s) 1410 (e.g., as part of the application 1406 of FIG. 14 operating on the user device(s) 1404 of FIG. 14).

In the embodiment shown in the FIG. 15, an item information data store 1504, a user account data store 1506, a content data store 1508, and an image data store 1510 are shown, although data can be maintained, derived, or otherwise accessed from various data stores, either remote or local to the content management engine 1402, to achieve the functions described herein. In at least one embodiment, one or more of the data stores described herein may be physically located on the user device(s) 1404 of FIG. 14 or alternatively, any suitable combination of the data stores may be operated as part of the service provider computer(s) 1410, for example, as part of an content management engine 1402. The content management engine 1402, as shown in FIG. 15, includes various modules such as a data processing module 1520, an image data manager 1522, a content data manager 1524, a distribution module 1526, and a graphical interface manager 1528. Some functions of the modules 1502 are described below. However, for the benefit of the reader, a brief, non-limiting description of each of the modules is provided in the following paragraphs.

In at least one embodiment, the content management engine 1402 includes the data processing module 520. In some embodiments, the data processing module 520 may be configured to obtain/receive/collect item information for any suitable number of items offered within the electronic marketplace. The item information may include any suitable attribute of an item (e.g., item name, item description, one or more prices associated with the item, one or more providers of the item, item weight, item dimensions, item materials, item color, etc.). The item information may further include one or more images of the item as provided within the electronic marketplace, a detail page identifier for a detail page associated with the item and provided within the electronic marketplace, etc. The data processing module 1520 may obtain/receive item information from any suitable source. In some embodiments, the data processing module 1520 may be configured to store the item information within the item information data store 1504. In some embodiments, the item information data store 1504 may be maintained by the service provider computer(s) 1410 of FIG. 14 and accessible by the data processing module 1520.

In some embodiments, the data processing module 1520 may be configured to receive and/or obtain user account data. User account data may include any suitable information associated with a user account maintained for a user of the electronic marketplace. User account data may include any suitable navigation information such as webpages visited and/or selections made by the user. In some embodiments, the user account data may further include historical behavior information identifying whether the user has previously generated digital content, background images provided by the user in the past, previous selections/modification made to digital content, or any suitable data indicating interactions with previously generated digital content. The data processing module 1520 may obtain/receive user account data from any suitable source. In some embodiments, the data processing module 1520 may be configured to store the user account data within the user account data store 1506. In some embodiments, the user account data store 1506 may be maintained by the service provider computer(s) 1410 of FIG. 14 and accessible by the data processing module 1520.

In some embodiments, the content management engine 1402 may include an image data manager 1522. The image data manager 1522 may be configured to generate and maintain image data structures (e.g., image data structures associated with items of the electronic marketplace). Functionality of the image data manager 1522 may be invoked by the graphical interface manager 1528 according to any suitable user input provided by any suitable user interface provided by the graphical interface manager (e.g., the user interfaces discussed above in connection with FIGS. 1-13). In some embodiments, the image data manager 1522 may be configured to receive a request for an image (corresponding to an item) from the graphical interface manager 1528. In response, the image data manager 1522 may be configured to retrieve an image of the item from the item information data store 1504. The image data manager 1522 may utilize image recognition techniques to identify the shape of the item depicted. The image data manager 1522 may crop the generated image such that the borders of the generated image may conform to the shape of the item within the original image. In some embodiments, the image data manager 1522 may add a border to the generated image (e.g., a solid colored border that also conforms to the shape of the item).

In at least one embodiment, the image data manager 1522 may be configured to generate an image data structure (e.g., the image data structure 402 of FIG. 4) to store the generated image (also referred to herein as a "sticker") and/or a reference to the generated image (e.g., a URI, identifier, and/or a retrieval location). The image data structure may be updated to include an item identifier corresponding to the item, a link (e.g., a URI) associated with a network page (e.g., a supplemental network page such as an item detail page, a social media page, or the like), the generated image (e.g., the sticker) and/or a location at which the generated image is stored. Generally, the image data structure may include any suitable data associated with the generated image and/or the item associated with the generated image. As another example, the image data structure may store an action (e.g., defined instructions and/or an API identifier to be utilized to perform operations) associated with user input provided at the image (e.g., a review, a rating, text, etc.). In some embodiments, the action may be predefined. In some embodiments, the image data manager 1522 may be configured to store the image data structure within the image data store 1510. It may be the case that the graphical interface manager 1528 requests an image for an item that has already been generated. In this scenario, the image data manager 1522 may be configured to retrieve the image data structure associated with the item in order to provide the image that was previously generated by the image data manager 1522. The image data manager 1522 may provide the requested image to the graphical interface manager 1528 for presentation within any suitable user interface provided by the graphical interface manager 1528.

In some embodiments, the content management engine 1402 may include an content data manager 1524. The content data manager 1524 may be configured to generate and maintain content data structures that define instances of digital content. Functionality of the content data manager 1524 may be invoked by the graphical interface manager 1528 according to any suitable user input provided by any suitable user interface provided by the graphical interface manager (e.g., the user interfaces discussed above in connection with FIGS. 1-13). In some embodiments, the content data manager 1524 may be configured to receive a request for digital content. The request may include any suitable information. By way of example, the request may include one or more identifiers corresponding to one or more image data structures, a background image and/or background image identifier, positioning and/or orientation information related to the images to be included in the digital content, or any suitable information corresponding to any suitable feature to be presented within an instance of digital content. The content data manager 1524 may be configured to generate and/or update the content data structure with images/identifiers/locations of the images corresponding to the image data structures. The image data structures and/or information contained within the image data structures may be obtained by the content data manager 1524 from the image data manager 1522 and/or directly from the image data store 1510. The background image and/or a background image identifier and/or positioning/orientation information associated with the images to be included in the digital content may be stored within the content data structure by the content data manager 1524.

As digital content is modified by a user, the modifications may be received by the graphical interface manager 1528 and provided to the content data manager 1524. The content data manager 1524 may be configured to update the content data structure for the instance of digital content according to these modification. A modification may include any suitable element/feature of the digital content such as background image, text, font, color scheme, one or more images corresponding to one or more items that are to be depicted within the digital content, positioning/orientation information corresponding to the images within the digital content, and the like. The content data manager 1524 may be configured to store and maintain content data structures within the content data store 1508.

In some embodiments, the content data manager 1524 may be configured to associate a content data structure with an identifier that identifies the user who authored the digital content. In some embodiments, the graphical interface manager 1528 may receive user input from any suitable interface described herein (or from a user interface not depicted) that indicates the user's desire to view all of the digital content previously generated by the user. A request may be provided to the content data manager 1524 and the digital content associated with the user identified (e.g., by retrieving all digital content associated with the user identifier). The content data manager 1524 may provide any suitable information to the graphical interface manager 1528 such that the graphical interface manager 1528 may cause the identified digital content to be displayed (e.g., via a gallery network page associated with the user and configured to present the identified content).

The graphical interface manager 1528, a component of the content management engine 1402 may be configured to provide any of the user interfaces discussed above in connection with FIGS. 1-13. The graphical interface manager 1528 may receive any suitable user input (e.g., user interface option selections, modifications to digital content, etc.) provided via those user interfaces. The graphical interface manager 1528 may be configured to process the user input to identify one or more operations to be performed in response to the user input. By way of example, if the user input indicates that the user desires to generate a new instance of digital content utilizing one or more selected items, the graphical interface manager 1528 may obtain/receive information for those items and provide such information to the image data manager 1522 to cause the image data manager 1522 to provide one or more images (e.g., stickers) that depict those items. The graphical interface manager 1528 may further invoke functionality of the content data manager 1524 in order to cause the content data manager 1524 to generate and/or update a content data structure according to the user input.

When providing the user interfaces of FIG. 1-13, the graphical interface manager 1528 may utilize user account data (e.g., historical behavior data, contextual information, etc.) for determinations as to how various elements of the user interfaces are to be provided. The graphical interface manager 1528 may utilize various predetermined protocols that specify when, and in what manner, various user interface options are to be provided. The graphical interface manager 1528 may utilize predetermined position schemes to identify where and how item images (e.g., stickers) are to be placed. In some embodiments, the graphical interface manager 1528 may execute any suitable image recognition techniques to analyze a received image in order to determine placement and/or orientation of an image of an item. Once an image of an item is provided (e.g., by the image data manager 1522) and placed (e.g., by the graphical interface manager), the graphical interface manager 1528 may execute any suitable operations to cause the content data manager 1524 to update the content data structure to reflect the inclusion and placement of the image of the item. Generally, the graphical interface manager 1528 may be configured to present digital content according to any suitable content data structure.

In some embodiments, the graphical interface manager 1528 may receive user input from a network page external to the electronic marketplace. By way of example, an interface may be provided as part of a web browser that enables the user to select item/images of items from a third-party source separate from the electronic marketplace and which have not previously been included in the item information data store 1504. In these scenarios, an image and/or a location of the image of the external network page may be received by the graphical interface manager 1528. This information may be provided to the image data manager 1522. Upon receipt, the image data manager 1522 may be configured to retrieve an image from the image location and generate a cropped version of the image in the manner described above. The image location (e.g., a URI of the external network page) may be stored in the image data structure for the generated image.

In some embodiments, the graphical interface manager 1528 may receive user input that indicates the user has selected a particular image within the digital content. The graphical interface manager 1528 may identify the image identifier and utilize the image identifier to identify (e.g., from the image data manager 1522 or from the image data store 1510 directly) an item detail page associated with the selected image. Once identified, the graphical interface manager 1528 may be configured to navigate the user to the item detail page. Accordingly, the graphical interface manager 1528 may be configured to implement browse-able links as part of an item image (e.g., a sticker) such that selection of the image causes the user to be navigated to an item detail page associated with the item depicted in the image.

In some embodiments, the graphical interface manager 1528 may provide an option to associate multiple instance of digital content with one another. Although not depicted, the graphical interface manager 1528 may provide a network page from which the digital content associated with a user may be presented. The user may utilize any suitable user interface elements provided by the graphical interface manager 1528 to indicate an association between two instances of digital content. The graphical interface manager 1528 may receive this indication and may execute any suitable operations to cause the content data manager 1524 to maintain an association between the instances of digital content (e.g., between two or more content data structures). Accordingly, the user may be enabled to create his own digital catalog that includes one or more instance of digital content. By way of example, a user may create multiple "pages" for a catalog, each page corresponding to an instance of digital content that depicts various items that the user hopes to receive. One instance (one "page") of digital content may depict clothing that the user desires, another might depict electronics of interest to the user. Once generated, the user may associate each "page" (each instance of digital content) with an identifier (e.g., "Bobby's birthday list") and may be provided user interface options for organizing the "pages" in a particular order as desired. The content data manager 1524 may maintain associations between these "pages" (corresponding to content data structure), or in some examples, the content data manager 1524 may generate a new instance of digital content (a new content data structure) to store the identifiers corresponding to the content data structure for each page and potentially the order in which the "pages" are to be arranged.

The graphical interface manager 1528 may further be configured to invoke functionality of the distribution module 1526. The distribution module 1526 may be configured to distribute digital content (e.g., a content data structure and, potentially, one or more image data structures) according to a selected method of distribution. For example, user input may be received by the graphical interface manager 1528 indicating that the user desires to share a particular instance of digital content with a particular recipient via text message. The user input may include information associated with the recipient such as the recipient's phone number. The graphical interface manager 1528 may send any suitable data to the distribution module 1526 to cause the distribution module 1526 to distribute the digital content as appropriate. For example, the graphical interface manager 1528 may provide the recipient's phone number and an identifier (e.g., a content data structure identifier) for the digital content to be shared. The distribution module 1526 may retrieve the content data structure identifier utilizing the content data manager 1524 or directly from the content data store 1508. In some embodiments, the distribution module 1526 may retrieve one or more image data structures references within the content data structure to update the content data structure with corresponding locations from which the images associated with the image data structures may be retrieved. The distribution module 1526 may electronically transmit the content data structure according to the distribution method requested. In some embodiments, the distribution module 1526 may be configured to transmit the content data structure via any suitable method such as text messaging and/or electronic mail. In some embodiments, the distribution module 1526 may be configured to transmit the content data structure to a particular social media platform such that the digital content defined by the content data structure may be presented via the social media platform (e.g., via a home page of the social media platform associated with the user).

Figure 16:
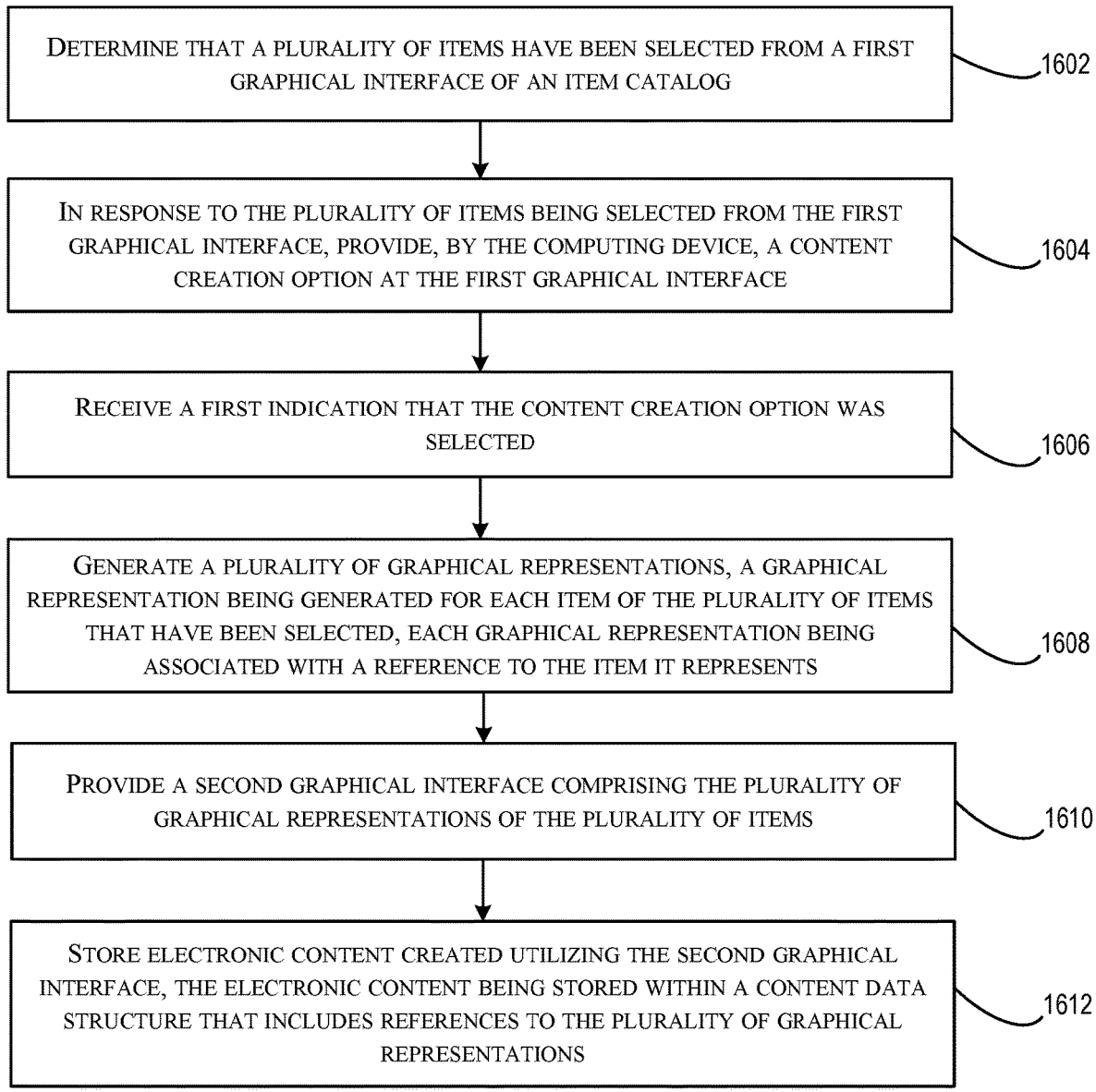
FIG. 16 is a flowchart illustrating an example method for generating digital content, in accordance with at least one embodiment.

FIG. 16 is a flowchart illustrating an example method 1600 for generating digital content, in accordance with at least one embodiment. It should be appreciated that the operations of the method 1600 may be performed in any suitable, not necessarily the order depicted in FIG. 16. Further, the method 1600 may include additional, or fewer operations than those depicted in FIG. 16. The operations of method 1600 may be performed by a computing device (e.g., the user device(s) 1404 of FIG. 14 and/or the service provider computer(s) 1410 of FIG. 14) at which at least a portion of the content management engine 1402 is executed. The computing device may include a processor and a memory storing computer-readable instructions that, upon execution by the processor, configure the computing device to perform the operations of the method 1600.

The method 1600 may begin at 1602, a determination may be made (e.g., by the graphical interface manager 1528 of FIG. 15) that a plurality of items have been selected (e.g., utilizing the user interface elements 116 and 118 of FIG. 1) from a first graphical interface (e.g., user interface 100 of FIG. 1) of an item catalog (e.g., an electronic marketplace catalog).

At 1604, in response to the plurality of items being selected from the first graphical interface, a content creation option (e.g., the content generation interface element 206 of FIG. 2) may be provided (e.g., by the graphical interface manager 1528) at the first graphical interface (as depicted in FIG. 2).

At 1606, a first indication that the content creation option was selected may be received (e.g., by the graphical interface manager 1528).

At 1608, a plurality of graphical representations may be generated (e.g., by the image data manager 1522 of FIG. 5). As discussed above, an image of the item (each item) may be retrieved (e.g., from the item information data store 1504). In some embodiments, each image may be modified. For example, each image may be cropped to conform to an outline of the corresponding item. In some embodiments, each graphical representation may be associated with a reference to the item it represents. By way of example, a graphical representation (and/or an identifier for the graphical representation) may be associated with an item identifier and/or network page. The association may be stored within an image data structure (e.g., the image data structure 402 of FIG. 4) corresponding to the graphical representation.

At 1610, a second graphical interface may be provided. In some embodiments, the second graphical interface may comprise the plurality of graphical representations of the plurality of items (e.g., see user interface 300 of FIG. 3, wherein images 304-308 represent three graphical representations corresponding to three separate items).

At 1612, electronic content created utilizing the second graphical interface may be stored (e.g., by the content data manager 1524 within the content data store 1508 of FIG. 15). In some embodiments, the electronic content may be stored within a content data structure (e.g., the content data structure 404 of FIG. 3) that includes references to the plurality of graphical representations (e.g., in the ongoing example, the references to the images 304, 306, and 308 of FIG. 3).

Figure 17:
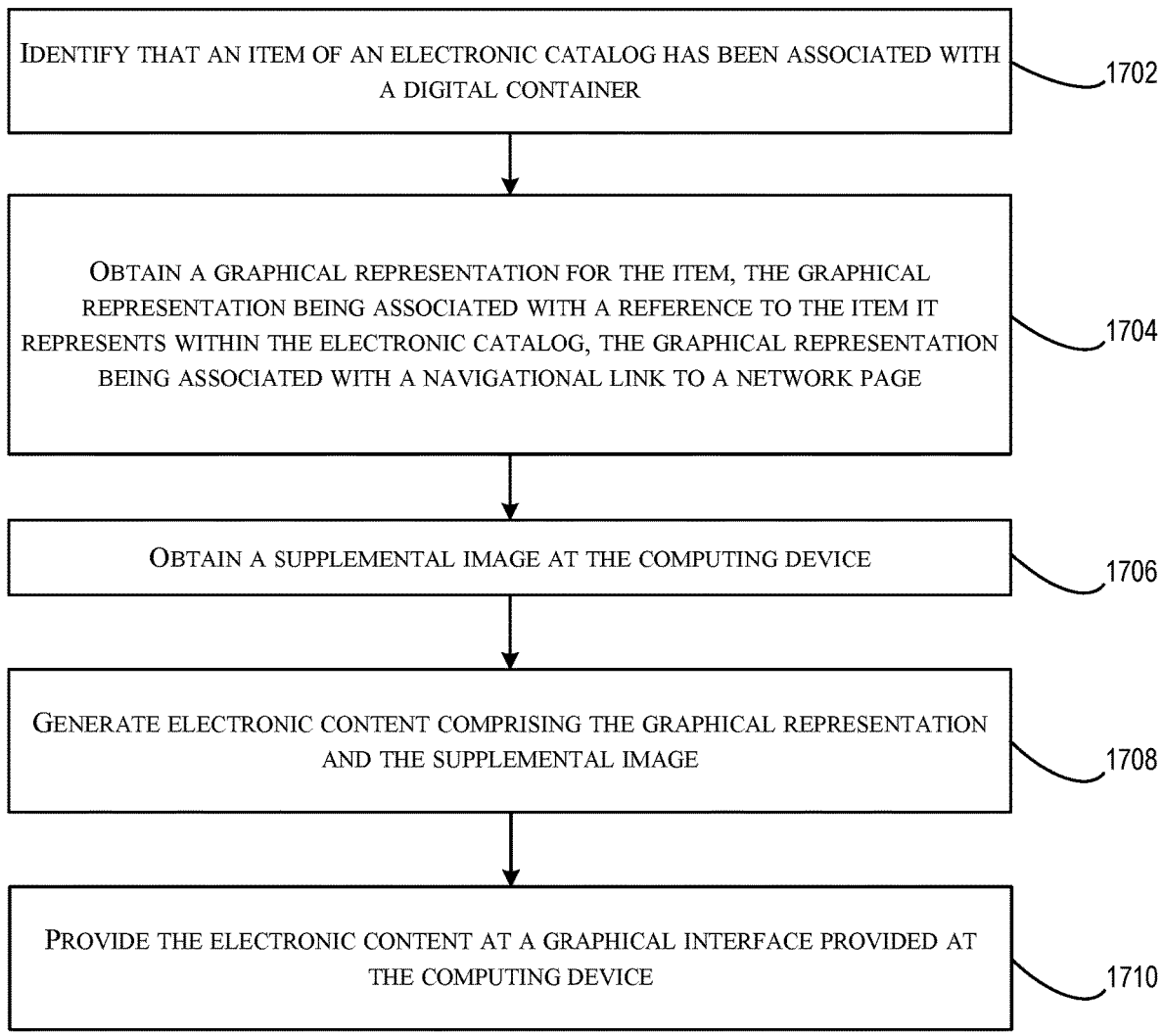
FIG. 17 is a flowchart illustrating another example method for generating digital content, in accordance with at least one embodiment.

FIG. 17 is a flowchart illustrating another example method 1700 for generating digital content, in accordance with at least one embodiment. It should be appreciated that the operations of the method 1700 may be performed in any suitable, not necessarily the order depicted in FIG. 17. Further, the method 1700 may include additional, or fewer operations than those depicted in FIG. 17. The operations of method 1700 may be performed by a computing device (e.g., the user device(s) 1404 of FIG. 14 and/or the service provider computer(s) 1410 of FIG. 14) at which at least a portion of the content management engine 1402 is executed. The computing device may include a processor and a memory storing computer-readable instructions that, upon execution by the processor, configure the computing device to perform the operations of the method 1700.

The method 1700 may begin at 1702, where it may be identified (e.g., by the graphical interface manager 1528 of FIG. 15) that an item of an electronic catalog has been associated with a digital container. For example, the graphical interface manager 1528 may be configured to identify that an item has been recently added to a particular digital container (e.g., a wish list, an idea list, a shopping cart, a search result list, etc.). In some embodiments, the digital container may already be associated with other items.

At 1704, a graphical representation for the item may be obtained (e.g., by the image data manager 1522 of FIG. 15). In some embodiments, the graphical representation of the item may be associated with a reference (e.g., an item identifier) to the item it represents within the electronic catalog. In some embodiments, the graphical representation may comprise a navigation link to a network page. As a non-limiting example, each image depicted in FIG. 9 may be an example of a graphical representation. Each image of FIG. 9 may be associated with an image data structure (e.g., the image data structure 402 of FIG. 4) that comprises an item identifier for the item and the navigation link (e.g., URI identifying an item detail page for the item within the electronic marketplace, a supplemental network page, etc.).

At 1706, a supplemental image may be obtained (e.g., by the graphical interface manager 1528). By way of example, the graphical interface manager 1528 may provide the capture option 1008 via the user interface 1000. Upon selection, the user may capture an image utilizing an image capture device (e.g., a camera).

At 1708, electronic content may be generated (e.g., by the content data manager 1524 of FIG. 15). The electronic content may comprise the graphical representation and the supplemental image. By way of example only, the supplemental image may comprise a subject (e.g., an image of a person). The electronic content may be generated to depict the graphical representation of the item as if positioned on the subject of the image. As a non-limiting example, the graphical interface manager 1528 may be configured to analyze the image 1014 of FIG. 10 to identify body parts of the subject 1016 of FIG. 10 utilizing any suitable image recognition techniques.

At 1710, the electronic content may be provided at a graphical interface at the computing device. Continuing with the example provided above, once identified, the image of the item (e.g., image 906 of FIG. 10) may be positioned (e.g., by the graphical interface manager 1528) over the image of the subject 1016 according to the body parts identified (e.g., the torso).

Figure 18:
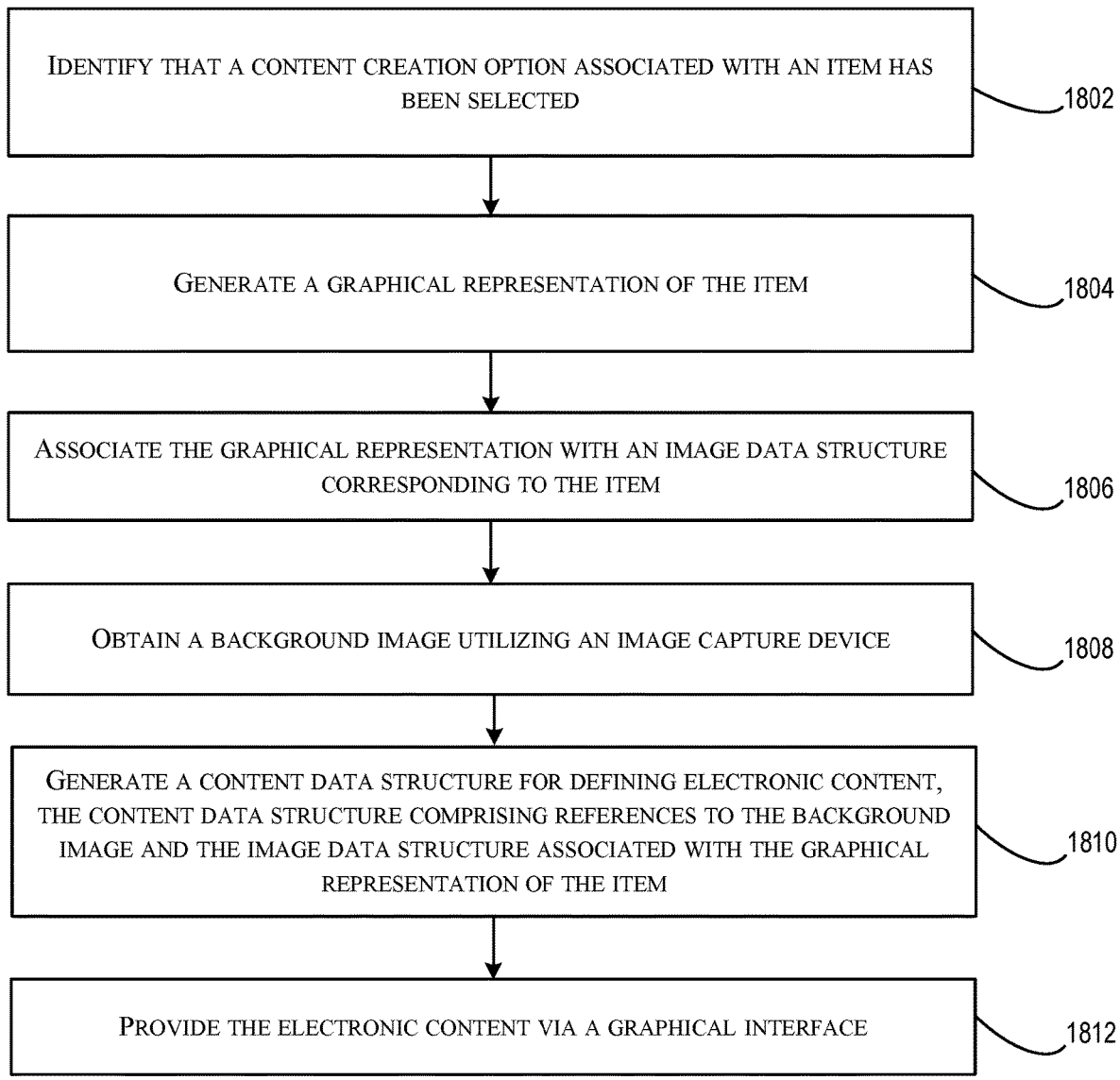
FIG. 18 is a flowchart illustrating yet another example method for generating digital content, in accordance with at least one embodiment.

FIG. 18 is a flowchart illustrating yet another example method 1800 for generating digital content, in accordance with at least one embodiment. It should be appreciated that the operations of the method 1800 may be performed in any suitable, not necessarily the order depicted in FIG. 18. Further, the method 1800 may include additional, or fewer operations than those depicted in FIG. 18. The operations of method 1800 may be performed by a computing device (e.g., the user device(s) 1404 of FIG. 14 and/or the service provider computer(s) 1410 of FIG. 14) at which at least a portion of the content management engine 1402 is executed. The computing device may include a processor and a memory storing computer-readable instructions that, upon execution by the processor, configure the computing device to perform the operations of the method 1800.

The method may begin at 1802, where it may be identified (e.g., by the graphical interface manager 1528 of FIG. 15) that a content creation option (e.g., the user interface option 1204 of FIG. 12) has been selected (e.g., via an item detail page associated with an item offered at an electronic marketplace, see FIG. 12).

At 1804, a graphical representation of the item may be generated (e.g., by the image data manager 1522 of FIG. 14). By way of example, a preexisting item image may be retrieved/obtained from the electronic marketplace (e.g., from a component of the electronic marketplace such as item information data store 1504). The preexisting item image may be altered by the image data manager 1522 in the manner described above in order to generate the graphical representation (e.g., a cropped image of the item, a "sticker," etc.).

At 1806, the graphical representation (or an identifier unique to the graphical representation, or a location from which the graphical representation may be retrieved) may be associated with an image data structure (e.g., the image data structure 402 of FIG. 4) corresponding to the item. In some embodiments, if a graphical representation for the item has previously been generated, the image data manager 1522 may retrieve the graphical representation from the appropriate image data structure.

At 1808, a background image (e.g., image 1206) may be obtained (e.g., by the graphical interface manager 1528) via a first graphical interface (e.g., user interface 1210 of FIG. 12). In some embodiments, the background image may be captured utilizing an image capture device of a computing device.

At 1810, a content data structure for defining electronic content may be generated (e.g., by the content data manager 1524 of FIG. 15). In at least one embodiment, the content data structure (e.g., the content data structure 404 of FIG. 4) may comprise references to the background image and the image data structure associated with the graphical representation of the item. By way of example, the content data structure corresponding to the electronic content depicted at FIG. 12 may include a reference to the image 1206 (e.g., a background image) and a reference to the image 1202 (e.g., an image of a light fixture).

At 1812, the electronic content may be provided via a graphical interface (e.g., user interface 1210 of FIG. 12 as provided by graphical interface manager 1528).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

determining, by a computing device, that a plurality of items have been selected from a first graphical interface of an item catalog, each of the plurality of items being associated with one or more respective images of an item;

in response to the plurality of items being selected from the first graphical interface, providing, by the computing device, a content creation option at the first graphical interface;

receiving, by the computing device, a first indication that the content creation option was selected;

generating graphical representations of a physical sticker for each item of the plurality of items that have been selected, each graphical representation depicting the physical sticker being generated from a respective image associated with a corresponding item;

generating a plurality of image data structures that correspond to and identify the graphical representations, each image data structure storing a reference to a respective item within the item catalog depicted by its corresponding graphical representation;

receiving, at a second user interface, user input defining electronic content, the electronic content depicting the graphical representations overlaid atop a background image;

providing, by the computing device at a second graphical interface, the electronic content as defined by the user input; and storing, by the computing device, the electronic content within a content data structure that includes references to the plurality of image data structures that correspond to the graphical representations;

providing, by the computing device, a third graphical interface for sharing the electronic content;

receiving, at the third graphical interface, user input indicating a method of distribution for distributing the electronic content; and distributing, by the computing device, the content data structure using the method of distribution in accordance with the user input, wherein distributing the content data structure to a recipient computing device enables the recipient computing device to generate a recipient version of the electronic content from the content data structure, the recipient version of the electronic content being modifiable at the recipient computing device.

2. The computer-implemented method of claim 1, wherein the second graphical interface further comprises a background selection option corresponding to assigning a background to the electronic content, and wherein selection of the background selection option causes the computing device to provide a plurality of background content from which the background to be assigned to the electronic content is selectable.

3. The computer-implemented method of claim 1, further comprising:

receiving, by the computing device at the second user interface, a subsequent selection corresponding to selection of one of the graphical representations; and providing, by the computing device, an item detail page corresponding an item of the plurality of items based at least in part on the subsequent selection.

4. The computer-implemented method of claim 1, further comprising:

receiving, by the computing device, a plurality of selections associated with the graphical representations of the plurality of items by a plurality of users to which the electronic content was distributed;

aggregating at least two subsets of the plurality of selections to calculate at least two values corresponding to the at least two subsets; and presenting, by the computing device, the at least two values via a fourth graphical interface.

5. The computer-implemented method of claim 1, comprising:

receiving feedback from the recipient computing device in response to distributing the content data structure, the feedback comprising a recipient version of the content data structure, the recipient version of the content data structure defining modified electronic content corresponding to the electronic content as modified by a user of the recipient computing device; and providing access to the feedback via a subsequent graphical interface using the recipient version of the content data structure.

6. A computing device, comprising:

a processor; and a memory storing computer-readable instructions that, upon execution by the processor, configure the computing device to, at least:

identify an image of an item of an electronic catalog;

obtain a graphical representation of the item, the graphical representation of the item depicting a physical sticker generated from the image of the item;

store a reference to the graphical representation of the item in an image data structure with a reference to an attribute associated with the item it represents and a navigational link to a network page associated with the item;

obtain, via an image capture device of the computing device, a supplemental image depicting a room;

receive, at a graphical interface, user input defining creation of electronic content, the electronic content depicting placement of the graphical representation of the image over the supplemental image depicting the room;

generate a content data structure that defines the electronic content, the content data structure comprising a reference to the image data structure and the supplemental image depicting a room; and distribute the electronic content based at least in part on distributing the content data structure to a recipient computing device, wherein distributing the content data structure to a recipient computing device enables the recipient computing device to generate a recipient version of the electronic content from the content data structure, the recipient version of the electronic content being modifiable at the recipient computing device.

7. The computing device of claim 6, wherein the computing device is further configured to:

identify a location within the supplemental image for the graphical representation; and store, in the content data structure, the location for the graphical representation.

8. The computing device of claim 6, wherein the supplemental image comprises a subject, and wherein the computing device is further configured to:

analyze, utilizing an image recognition technique, the supplemental image to identify a body part of the subject, wherein the graphical representation is provided as if positioned at the body part of the subject.

9. The computing device of claim 6, wherein the image data structure comprises an image identifier corresponding to the graphical representation of the item, an item identifier associated with the item, one or more item attributes associated with the item, and the navigational link.

10. The computing device of claim 6, wherein the computing device is further configured to:

provide, at a second graphical interface, a distribution option for distributing the electronic content wherein the electronic content is distributed to the recipient computing device based at least in part on an indication that the distribution option was selected via the graphical interface.

11. The computing device of claim 6, wherein the computing device is further configured to:

receive feedback from at least one recipient computing device subsequent to distributing the content data structure; and provide, at an additional graphical interface, a corresponding feedback option for viewing the feedback received.

12. The computing device of claim 11, wherein the feedback is received in a corresponding recipient version of the content data structure and wherein the feedback corresponds to an alternate placement of the graphical representation within the supplemental image.

13. The computing device of claim 12, wherein the feedback comprises a different graphical representation corresponding to a different item.

14. The computing device of claim 6, wherein the item is identified based at least in part on determining the item was placed in a digital shopping cart or a digital wish list.

15. A non-transitory computer-readable storage medium having stored thereon computer-executable instructions that, upon execution by a processor, cause a computing device to perform operations comprising:

identifying that a content creation option of a user interface has been selected, the user interface being a webpage associated with an item of an electronic catalog;

generating a graphical representation of the item from an image of the item, the graphical representation depicting a physical sticker derived from the image;

storing a reference to the graphical representation within an image data structure corresponding to the item;

obtaining a background image utilizing an image capture device of the computing device;

receiving user input defining creation of electronic content, the electronic content depicting placement of the graphical representation of the item over the background image;

generating a content data structure for the electronic content created, the content data structure comprising references to the background image and the image data structure that stores the reference to the graphical representation of the item; and distributing the electronic content created based at least in part on distributing the content data structure to a recipient computing device, wherein distributing the content data structure to a recipient computing device enables the recipient computing device to generate a recipient version of the electronic content from the content data structure, the recipient version of the electronic content being modifiable at the recipient computing device.

16. The non-transitory computer-readable storage medium of claim 15, wherein the computer-executable instructions, upon execution by the processor, causes the computing device to perform further operations comprising:
identifying a similar item that is similar to the item within a similarity threshold;
obtaining an additional graphical representation for the similar item; and
providing, via an additional graphical interface, the additional graphical representation of the similar item, the additional graphical interface enabling the additional graphical representation to be placed within the background image to modify the electronic content.

17. The non-transitory computer-readable storage medium of claim 15, wherein the image data structure comprises at least one of: an identifier corresponding to the graphical representation, an item identifier corresponding to the item, an item attribute associate with the item, a navigational link associated with the item.

18. The non-transitory computer-readable storage medium of claim 15, wherein the computer-executable instructions, upon execution by the processor, causes the computing device to perform further operations comprising:
providing a predetermined image associated with an additional image data structure, the additional image data structure storing an association to an application programming interface (API);
determining, based at least in part on subsequent user input, that the predetermined image has been placed within the electronic content within a threshold distance of the graphical representation of the item; and
storing an association to the image data structure of the item within the additional image data structure;
receiving user input utilizing the predetermined image within the electronic content; and
providing the user input via the API, wherein providing the user input via the API causes an attribute associated with item to be updated within the electronic catalog.

19. The non-transitory computer-readable storage medium of claim 15, wherein the computer-executable instructions, upon execution by the processor, causes the computing device to perform further operations comprising:
receiving feedback from the recipient computing device in response to distributing the content data structure, the feedback comprising a recipient version of the content data structure, the recipient version of the content data structure defining modified electronic content corresponding to the electronic content as modified by a user of the recipient computing device; and
providing access to the feedback via a subsequent graphical interface using the recipient version of the content data structure.

* * * * *